US012081473B2

(12) United States Patent
Zarifi

(10) Patent No.: US 12,081,473 B2
(45) Date of Patent: Sep. 3, 2024

(54) UPLINK SOUNDING REFERENCE SIGNAL CARRIER AGGREGATION

(71) Applicant: Keyvan Zarifi, Ottawa (CA)

(72) Inventor: Keyvan Zarifi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 455 days.

(21) Appl. No.: 17/410,470

(22) Filed: Aug. 24, 2021

(65) Prior Publication Data

US 2022/0069959 A1 Mar. 3, 2022

Related U.S. Application Data

(60) Provisional application No. 63/070,358, filed on Aug. 26, 2020.

(51) Int. Cl.
*H04W 72/51* (2023.01)
*H04L 5/00* (2006.01)

(52) U.S. Cl.
CPC .......... *H04L 5/0048* (2013.01); *H04W 72/51* (2023.01)

(58) Field of Classification Search
None
See application file for complete search history.

(56) References Cited

U.S. PATENT DOCUMENTS

| 2019/0254076 A1* | 8/2019 | Siomina ............... H04L 5/0048 |
| 2019/0296874 A1* | 9/2019 | Chung ................ H04W 72/20 |
| 2019/0297611 A1* | 9/2019 | Rico Alvarino .. H04W 52/0206 |
| 2020/0100201 A1 | 3/2020 | Farmanbar et al. |
| 2020/0204407 A1* | 6/2020 | Liu ..................... H04L 25/0226 |
| 2021/0036825 A1* | 2/2021 | Choi ..................... H04L 5/0048 |
| 2021/0400555 A1* | 12/2021 | Park .................... H04W 36/305 |

(Continued)

FOREIGN PATENT DOCUMENTS

| WO | 2019203711 A1 | 10/2019 |
| WO | 2020155362 A1 | 8/2020 |

OTHER PUBLICATIONS

MediaTek Inc., "Views on Positioning enhancement for Rel-17", R1-2003669, 3GPP TSG-RAN WG1 #101, May 25-Jun. 5, 2020, e-Meeting; 5 pages.

(Continued)

*Primary Examiner* — Phirin Sam

(57) ABSTRACT

Methods and devices for sounding reference signal (SRS) carrier aggregation are provided. A target device is configured with N (N≥2) SRSs that include a reference SRS and N−1 target SRS. Lower layer signaling, such as a MAC-CE or a DCI message, is used to activate the N−1 target SRS, such that each of the N SRSs is transmitted on a respective carrier component from a common antenna port. The lower level signaling used to activate the target SRS may identify configuration parameters of the target SRS that are to be overridden by the corresponding configuration parameters of the reference SRS. Embodiments of the present disclosure increase the effective SRS bandwidth, which may improve positioning measurement accuracy, while also reducing the higher-layer configuration signaling by activating target SRS in lower layer signaling and overriding some configuration parameters of the target SRS by the corresponding configuration parameters of the reference SRS.

20 Claims, 8 Drawing Sheets

(56) References Cited

U.S. PATENT DOCUMENTS

| | | | |
|---|---|---|---|
| 2022/0029764 A1* | 1/2022 | Liou | H04L 5/0094 |
| 2022/0060307 A1* | 2/2022 | Manolakos | H04L 5/0051 |
| 2022/0231812 A1* | 7/2022 | Go | H04W 72/23 |
| 2022/0231823 A1* | 7/2022 | Shin | H04W 52/32 |

OTHER PUBLICATIONS

Motorola et al. Maintenance for SRS 3GPP TSG RAN WG1 Meeting #94-bis R1-1811291,Dec. 10, 2018, sections 2-3,total 5 pages.

OPPO Remaining Issues on UL Positioning Reference Signal 3GPP TSG RAN WGI #100 R1-2000463 Mar. 6, 2020 (Mar. 6, 2020) sections 2-3,total 4 pages.

3GPP TSGRAN Physical layer procedures for data(Release 16) 3GPP TS 38.214 V16.2.0 Jun. 30, 2020(Jun. 30, 2020) section 6.2.1,total 163 pages.

* cited by examiner

UPLINK SOUNDING REFERENCE SIGNAL CARRIER AGGREGATION

CROSS-REFERENCE TO RELATED APPLICATION

This application claims the benefit of U.S. Provisional Patent Application No. 63/070,358 entitled "UPLINK SOUNDING REFERENCE SIGNAL CARRIER AGGREGATION" filed Aug. 26, 2020, the entire contents of which is incorporated herein by reference.

FIELD

The present disclosure relates generally to wireless communications, and in particular embodiments, to systems and methods for generating and utilizing carrier aggregated sounding reference signals (SRSs) for uplink-based measurement.

BACKGROUND

In many wireless communication networks, the network conducts uplink channel measurements based on sounding reference signals (SRS) transmitted by a UE. For example, SRSs may be used for a variety of purposes including positioning, channel state information (CSI) acquisition, beam management and Uplink (UL)-based radio resource management (RRM) measurements.

In wireless communications networks, positioning is the process of determining the geographical location of a device, such as a mobile device (e.g., smartphone, laptop, tablet or personal digital assistant (PDA), etc.) or navigation/tracking equipment. A device for which a position is to be determined may be referred to as a target device. Once the coordinates of a target device have been established, the coordinates may be mapped to a location (e.g., a road, a building address, etc.), and then reported to a requesting service or device. The mapping functionality and the delivery of location information may be referred to as location services (LCS), which various other services may depend upon. Services that utilize location data may be referred to as location-based services (LBSs). LBSs can be used to provide location aware applications for a user of a device (e.g., to deliver localized weather forecasts, location-specific targeted advertising, navigation applications, emergency services, etc.), optimize network performance and/or to enhance automated services (e.g., network self-learning, self-optimization, etc.).

An increasing number of applications that rely on accurate and timely wireless-device positioning are being developed, and therefore there is an increasing demand for more accurate and reliable positioning. Uplink-based positioning solutions are based on the transmission of uplink (UL) sounding reference signals (SRSs) from a target device and measurements based on the received UL SRSs at network nodes in a radio access network (RAN). The measurements performed by a network node based on a received UL SRS might include UL Reference Time of Arrival (UL RTOA), UL Angle of Arrival (UL AoA), and/or network node Reception-Transmission (Rx-Tx) time difference measurements, for example. The accuracy of such UL-based measurements has a direct relation with the bandwidth of the measured SRS, which in many wireless communications networks is limited to the active bandwidth part (BWP) of a carrier component (CC). For example, in the current new radio (NR) standard the maximum size of an active BWP of a CC is limited to 400 MHz. However, in order to achieve a positioning accuracy on the order of 10 centimeters a measured SRS bandwidth (BW) of at least 1 GHz may be required.

SRS carrier aggregation (CA), whereby multiple CCs are aggregated for transmission of SRS, has been proposed as a candidate method to increase SRS bandwidth. However, existing SRS CA configuration mechanisms suffer from high signaling overhead, UE battery drainage, large latency, and unnecessary SRS transmission occasions.

Therefore, it would be desirable to provide methods and apparatuses for improved SRS carrier aggregation configurations in a wireless communication network.

SUMMARY

The present disclosure provides methods and apparatuses that may be used to implement new uplink sounding reference signals carrier aggregation techniques that utilize lower layer signaling, such as medium access control (MAC) control element (MAC-CE) messages or dynamic control information (DCI) messages, to activate and/or update carrier aggregated SRSs without requiring reconfiguration through higher layer signaling.

For example, a first broad aspect of the present disclosure provides a method for SRS carrier aggregation in a wireless communication network in which a user equipment (UE) receives higher layer signaling that includes SRS configuration information for a plurality of SRSs and lower layer signaling that includes information associating N−1 target SRS from the plurality of SRSs with a reference SRS from the plurality of SRSs, wherein N is an integer greater than or equal to 2. The UE may also transmit the N SRSs, inclusive of the reference SRS and the associated N−1 target SRS, on N different respective carrier components (CCs) on a same set of one or more antenna ports such that the N SRSs transmitted on N CCs are coherently combinable, thereby effectively increasing the total effective SRS bandwidth to the sum of the active BWPs of the same or multiple different carrier components on which the SRSs are transmitted.

In some embodiments, the higher layer signaling includes a radio resource control (RRC) message and the lower layer signaling includes a medium access control-control element (MAC-CE) message or a downlink control information (DCI) message.

In some embodiments, transmitting the N SRSs includes overriding configuration parameters for the associated N−1 target SRS with corresponding configuration parameters for the reference SRS based at least in part on the information associating the N−1 target SRS with the reference SRS.

In some embodiments, the reference SRS is a first reference SRS from the plurality of SRSs, and the UE receives lower layer signaling that includes information associating P−1 target SRS from the plurality of SRSs with a second reference SRS from the plurality of SRSs, wherein P is an integer greater than or equal to two and the P−1 target SRS includes at least one of the N−1 target SRS. In such embodiments, configuration parameters for the associated P−1 target SRS may be overridden with corresponding configuration parameters for the second reference SRS based at least in part on the information associating the P−1 target SRS with the second reference SRS. Furthermore, the UE, after transmitting the reference SRS and the associated N−1 target SRS, may transmit the P SRSs, inclusive of the second reference SRS and the associated P−1 target SRS on P different respective CCs on a same set of one or more antenna ports such that the P SRSs transmitted on P CCs are coherently combinable.

In some embodiments, the SRS configuration information received via higher layer signaling includes a list of target SRS candidates or their corresponding serving cell identifiers (IDs). In such embodiments, the information received via lower layer signaling and associating the N−1 target SRS with the reference SRS may include information identifying the N−1 target SRS among the list of target SRS candidates as the N−1 target SRS to be transmitted on the same set of at least one antenna port as the reference SRS. Such embodiments may enable enabling a group of target SRS to be activated/updated in MAC-CE/DCI for each reference SRS resource (or resource set) without any need for RRC re-configuration. Therefore, a reference SRS resource (or resource set) can have a flexible set of target SRS resources (resource sets) that can be updated by MAC-CE/DCI. Similarly, a target SRS resource (set) may be activated/triggered with a new reference SRS resource (set) by MAC-CE/DCI message without any need for RRC reconfiguration.

In some embodiments, the SRS configuration information received via higher layer signaling may include, for one or more target SRS candidates inclusive of the N−1 target SRS, a corresponding list of reference SRS candidates. In such embodiments, the information received via lower layer signaling and associating the N−1 target SRS with the reference SRS may include information identifying, for each of the N−1 target SRS, the reference SRS among the corresponding list of reference SRS candidates for the target SRS. Such embodiments may enable a reference SRS resource (or resource set) to be activated/updated for each target SRS resource (set) in MAC-CE/DCI from a list of pre-configured reference SRS resource (set) candidates without any need for RRC re-configuration. It is noted that one SRS resource (set) can be a reference SRS resource (set) for more than one target SRS resource (set). In some such embodiments, the higher layer signaling may include information that indicates, for each reference SRS candidate, at least its serving cell ID, bandwidth part ID, and SRS ID.

In some embodiments, the SRS configuration information received via higher layer signaling may include, for each of a plurality of reference SRS candidates inclusive of the reference SRS, a corresponding list of target SRS candidates. In such embodiments, the information received via lower layer signaling and associating the N−1 target SRS with the reference SRS may include information identifying the N−1 target SRS among the corresponding list of target SRS candidates for the reference SRS. Such embodiments may enable a group of N−1 SRS resources (or resource sets) to be activated/updated for each reference SRS resource (set) in MAC-CE/DCI from a list of pre-configured target SRS resource (set) candidates without any need for RRC re-configuration. It is noted that one SRS resource (set) can be a target candidate for more than one reference SRS resource (set) as long as it is not activated/triggered for more than one reference SRS resource (set) at any time interval. In some such embodiments, the higher layer signaling may include information that indicates, for each target SRS candidate, at least its serving cell ID, bandwidth part ID, and SRS ID.

In some embodiments, the SRS configuration information received via higher layer signaling includes N lists of M serving cell indices, $L_1, \ldots L_N$, $M \geq N$. In such embodiments, the information received via lower layer signaling and associating the N−1 target SRS with the reference SRS may include information identifying K sets of serving cell indices, $S_1, \ldots, S_K$, from the N lists of M serving cell indices, $L_1, \ldots L_N$. In some such embodiments, each set of serving cell indices $S_k$ (k=1, . . . , K) may include N serving cell indices, wherein no two serving cell indices in the same set $S_k$ belong to the same list $L_j$ (j=1, . . . , N), and the reference SRS and the N−1 target SRS may be the N SRSs with the same ID in the N serving cells corresponding to the N serving cell indices included in one of the K sets of serving cell indices, $S_1, \ldots, S_K$, identified in the information received via lower layer signaling. Such embodiments may enable SRS resources (resource sets) in multiple sets of cells are activated/updated or triggered using a single MAC-CE or DCI message.

In some embodiments, the SRS configuration information received via higher layer signaling may include target SRS configuration information that, for each of the N−1 target SRS, identifies the reference SRS. In such embodiments, during a time interval that the reference SRS is activated, original configuration parameters for the associated N−1 target SRS may be overridden with corresponding configuration parameters for the reference SRS, and the N SRSs, inclusive of the reference SRS and the associated N−1 target SRS, may be transmitted on N different respective CCs on the same set of one or more antenna ports. Such embodiments may enable a target SRS resource (set) to be associated with a reference SRS resource (set), such that one reference SRS resource (set) can be included in the configuration of N−1 (N>=2) target SRS resources (resource sets). Furthermore, the target SRS resource (set) may be transmitted based on its own configuration unless its reference SRS resource (set) is active. This may facilitate using target SRS resources for other purposes outside the active time of the reference SRS resource (set). In some such embodiments, outside the time interval that the reference SRS is activated, the N−1 target SRS may be transmitted based on their original configuration parameters. In some such embodiments, the information received via lower layer signaling and associating the N−1 target SRS with the reference SRS may include information for selectively activating or de-activating the reference SRS. In some cases, the target SRS configuration information may identify the reference SRS with at least its serving cell ID, BWP ID, and SRS ID, for example.

In some embodiments, the SRS configuration information received via higher layer signaling includes, for each of a plurality of reference SRS candidates inclusive of the reference SRS, a corresponding list of N−1 target SRS candidates. In such embodiments, during a time interval that the reference SRS is activated, original configuration parameters for the N−1 target SRS in the list of N−1 target SRS candidates corresponding to the reference SRS may be overridden with corresponding configuration parameters for the reference SRS, and the N SRSs, inclusive of the reference SRS and the N−1 target SRS in the list of N−1 target SRS candidates corresponding to the reference SRS, may be transmitted on N different respective CCs on the same set of one or more antenna ports. Such embodiments may enable N−1 (N>=2) target SRS resource sets to be indicated in the configuration of the reference SRS resource set. In some such embodiments, outside the time interval that the reference SRS is activated, the N−1 target SRS in the list of N−1 target SRS candidates corresponding to the reference SRS may be transmitted based on their original configuration parameters. In some such embodiments, the information received via lower layer signaling and associating the N−1 target SRS with the reference SRS includes information for selectively activating or de-activating the reference SRS.

In some embodiments, the SRS configuration information received via higher layer signaling includes a sequence of M IDs and the information received via lower layer signaling and associating the N−1 target SRS with the reference SRS includes information indicating, for each of the plurality of SRSs, one of the IDs from the sequence of M IDs such that N SRSs of the plurality of SRSs have a same indicated ID from the sequence of M IDs. In such embodiments, the reference SRS and the N−1 target SRS may be those N SRSs having the same ID indicated by the information received via lower layer signaling. Such embodiments may be advantageous in that the group of N SRS resources (resource sets) that may be transmitted on the same set of antenna ports are indicated using a shared ID value where this ID can be different from the resource (set) ID of the corresponding SRS resources (resource sets).

In some embodiments, the UE may transmit SRS capability information indicating the UE is capable of transmitting N SRSs on N carrier components each on a different carrier component on a same set of at least one antenna port.

In some embodiments, the UE may transmit SRS capability information indicating the UE is capable of transmitting N SRSs on N carrier components each on a different carrier component on a same set of at least one antenna port. For example, the SRS capability information might include information indicating one or more of: support for N power amplifier structure; support for phase continuity; support for phase continuity for SRS; support for same antenna port transmission; support for same set of antenna ports transmission; support for same antenna port transmission for SRS; or support for same antenna set of ports transmission for SRS. In some cases, the SRS capability information may be transmitted to a serving base station using radio resource control (RRC) protocol and/or to a location management function (LMF) in the wireless communication network using a long term evolution positioning protocol (LPP).

A second broad aspect of the present disclosure provides an apparatus for SRS carrier aggregation in a wireless communication network. For example, the apparatus may include at least one processor and a computer readable storage medium operatively coupled to the at least one processor. The computer readable storage medium may store programming for execution by the at least one processor, the programming comprising instructions for implementing the method according to the first broad aspect of the present disclosure.

A third broad aspect of the present disclosure provides another method for SRS carrier aggregation in a wireless communication network in which a BS transmits, to a UE, higher layer signaling that includes SRS configuration information for a plurality of SRSs and lower layer signaling that includes information associating N−1 target SRS from the plurality of SRSs with a reference SRS from the plurality of SRSs, wherein N is an integer and N≥2. The BS may also receive, from the UE, the N SRSs, inclusive of the reference SRS and the associated N−1 target SRS, on N different respective carrier components (CCs), the N SRSs having been transmitted by the UE on a same set of one or more antenna ports such that the N SRSs received on N CCs are coherently combinable at the BS.

In some embodiments, the higher layer signaling includes a radio resource control (RRC) message and the lower layer signaling includes a medium access control-control element (MAC-CE) message or a downlink control information (DCI) message.

In some embodiments, the BS coherently combines the N SRSs received on N CCs and performs at least one uplink channel measurement based on the coherent combination of the N SRSs received on N CCs.

In some embodiments, the BS transmits the lower layer signaling that includes information associating N−1 target SRS from the plurality of SRSs with a reference SRS from the plurality of SRSs in order to cause configuration parameters for the associated N−1 target SRS to be overridden with corresponding configuration parameters for the reference SRS.

In some embodiments, the reference SRS is a first reference SRS from the plurality of SRSs, and the BS further transmits lower layer signaling to the UE that includes information associating P−1 target SRS from the plurality of SRSs with a second reference SRS from the plurality of SRSs, wherein P is an integer, P≥2, and the P−1 target SRS includes at least one of the N−1 target SRS, wherein the lower layer signaling that includes information associating the P−1 target SRS with the second reference SRS causing configuration parameters for the associated P−1 target SRS to be overridden with corresponding configuration parameters for the second reference SRS. In such embodiments, the BS may receive, from the UE, the P SRSs, inclusive of the second reference SRS and the associated P−1 target SRS, on P different respective carrier components (CCs), the P SRSs having been transmitted by the UE on a same set of one or more antenna ports such that the P SRSs transmitted on P CCs are coherently combinable at the BS.

In some embodiments, the SRS configuration information transmitted via higher layer signaling may include a list of target SRS candidates or their corresponding serving cell identifiers (IDs). In such embodiments, the information transmitted via lower layer signaling and associating the N−1 target SRS with the reference SRS may include information identifying the N−1 target SRS among the list of target SRS candidates as the N−1 target SRS to be transmitted on the same set of at least one antenna port as the reference SRS.

In some embodiments, the SRS configuration information transmitted via higher layer signaling may include, for one or more target SRS candidates inclusive of the N−1 target SRS, a corresponding list of reference SRS candidates. In such embodiments, the information transmitted via lower layer signaling and associating the N−1 target SRS with the reference SRS may include information identifying, for each of the N−1 target SRS, the reference SRS among the corresponding list of reference SRS candidates for the target SRS.

In some embodiments, the SRS configuration information transmitted via higher layer signaling may include, for each of a plurality of reference SRS candidates inclusive of the reference SRS, a corresponding list of target SRS candidates. In such embodiments, the information transmitted via lower layer signaling and associating the N−1 target SRS with the reference SRS includes information identifying the N−1 target SRS among the corresponding list of target SRS candidates for the reference SRS.

In some embodiments, the SRS configuration information transmitted via higher layer signaling may include a list of M serving cell indices, In such embodiments, the information transmitted via lower layer signaling and associating the N−1 target SRS with the reference SRS may include information identifying N serving cell IDs from the list of M serving cell IDs. In some such embodiments, the reference SRS and the N−1 target SRS may be the N SRSs with the same ID in the N serving cells corresponding to the N serving cell IDs identified in the information transmitted via lower layer signaling.

In some embodiments, the SRS configuration information transmitted via higher layer signaling may include N lists of M serving cell indices, $L_1, \ldots L_N$, $M \geq N$. In such embodiments, the information transmitted via lower layer signaling and associating the N−1 target SRS with the reference SRS may include information identifying K sets of serving cell indices, $S_1, \ldots, S_K$, from the N lists of M serving cell indices, $L_1, \ldots L_N$. For example, each set of serving cell indices $S_k$ (k=1, ..., K) may include N serving cell indices, wherein no two serving cell indices in the same set $S_k$ belong to the same list $L_j$ (j=1, ..., N). In some such embodiments, the reference SRS and the N−1 target SRS may be the N SRSs with the same ID in the N serving cells corresponding to the N serving cell indices included in one of the K sets of serving cell indices, $S_1, \ldots, S_K$, identified in the information transmitted via lower layer signaling.

In some embodiments, the SRS configuration information transmitted via higher layer signaling may include target SRS configuration information that, for each of the N−1 target SRS, identifies the reference SRS. In such embodiments, transmitting the lower layer signaling to the UE may include transmitting lower layer signaling to the UE to activate the reference SRS such that, during a time interval that the reference SRS is activated, original configuration parameters for the associated N−1 target SRS are overridden with corresponding configuration parameters for the reference SRS, and the N SRSs, inclusive of the reference SRS and the associated N−1 target SRS, are received by the BS on N different respective CCs. In such embodiments, outside the time interval that the reference SRS is activated, the BS may receive, from the UE, the N−1 target SRS based on their original configuration parameters. In some such embodiments, the information transmitted via lower layer signaling may include information for selectively activating or de-activating the reference SRS.

In some embodiments, the SRS configuration information transmitted via higher layer signaling may include, for each of a plurality of reference SRS candidates inclusive of the reference SRS, a corresponding list of N−1 target SRS candidates. In such embodiments, transmitting the lower layer signaling to the UE may include transmitting lower layer signaling to the UE to activate the reference SRS such that, during a time interval that the reference SRS is activated, original configuration parameters for the N−1 target SRS in the list of N−1 target SRS candidates corresponding to the reference SRS are overridden with corresponding configuration parameters for the reference SRS and the N SRSs, inclusive of the reference SRS and the N−1 target SRS in the list of N−1 target SRS candidates corresponding to the reference SRS, are received by the BS on N different respective CCs. In such embodiments, outside the time interval that the reference SRS is activated, the BS may receive the N−1 target SRS in the list of N−1 target SRS candidates corresponding to the reference SRS based on their original configuration parameters. In some such embodiments, the information transmitted via lower layer signaling may include information for selectively activating or de-activating the reference SRS.

In some embodiments, the SRS configuration information transmitted via higher layer signaling may include a sequence of M IDs. In such embodiments, the information transmitted via lower layer signaling and associating the N−1 target SRS with the reference SRS may include information indicating, for each of the plurality of SRSs, one of the IDs from the sequence of M IDs such that N SRSs of the plurality of SRSs have a same indicated ID from the sequence of M IDs. In some embodiments, the reference SRS and the N−1 target SRS may be those N SRSs having the same ID indicated by the information transmitted via lower layer signaling.

In some embodiments, the BS may receive SRS capability information for the UE indicating the UE is capable of transmitting N SRSs on N carrier components each on a different carrier component on a same set of at least one antenna port. For example, the SRS capability information may include information indicating one or more of: support for N power amplifier structure; support for phase continuity; support for phase continuity for SRS; support for same antenna port transmission; support for same set of antenna ports transmission; support for same antenna port transmission for SRS; or support for same antenna set of ports transmission for SRS. In such embodiments, the SRS capability information may be received by the BS from the UE using radio resource control (RRC) protocol and/or from a location management function in the wireless communication network using new radio positioning protocol a protocol.

A fourth broad aspect of the present disclosure provides another apparatus for SRS carrier aggregation in a wireless communication network. For example, the apparatus may include at least one processor and a computer readable storage medium operatively coupled to the at least one processor. The computer readable storage medium may store programming for execution by the at least one processor, the programming comprising instructions for implementing the method according to the third broad aspect of the present disclosure.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

FIGS. 1, 2, 3A and 3B and 4 following below provide context for the network and devices that may be in the network and that may implement aspects of the present disclosure.

Figure 1:
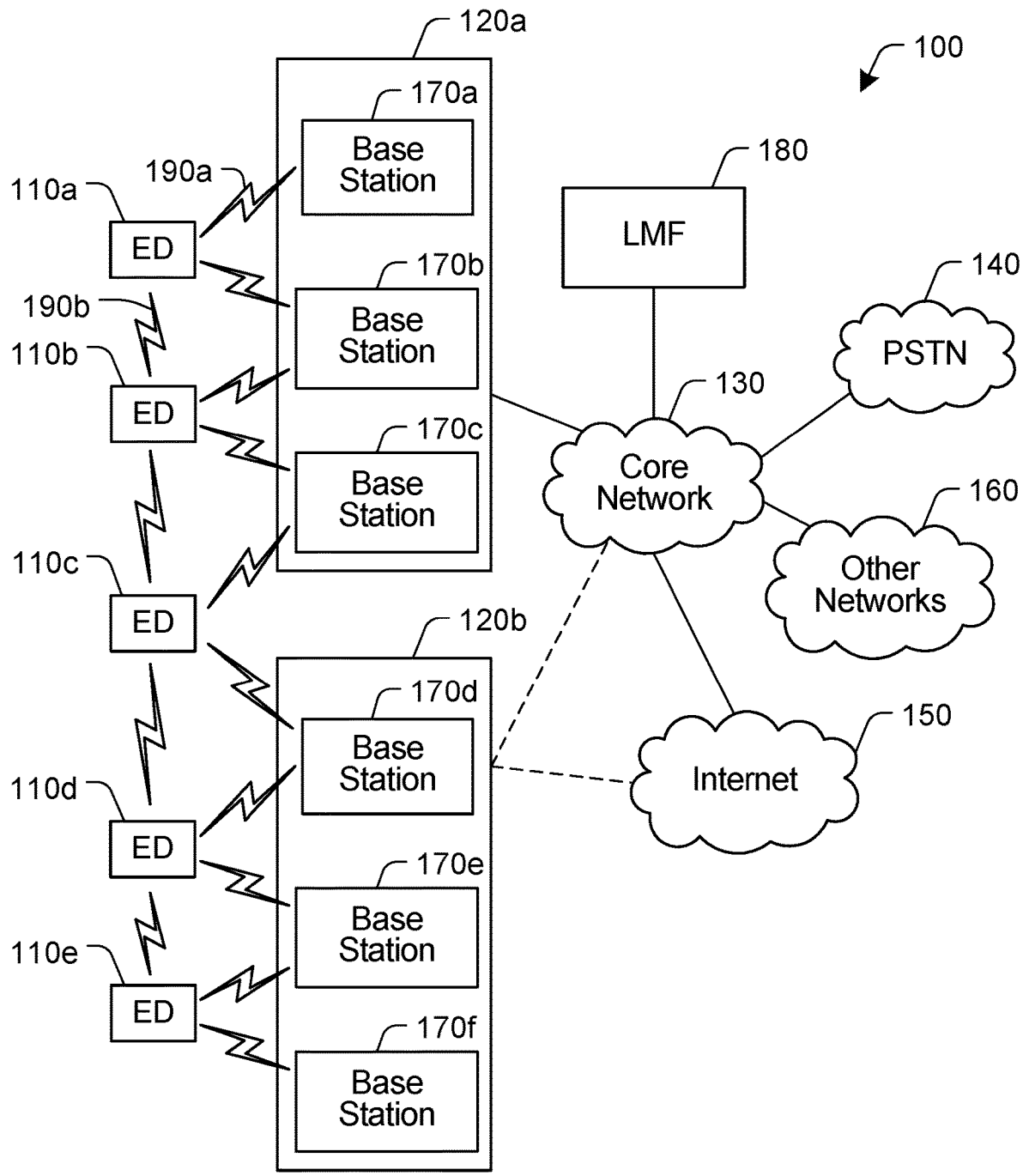
FIG. 1 illustrates an example communication system in which embodiments of the present disclosure could be implemented.

FIG. 1 illustrates an example wireless communication system 100 (also referred to as wireless system 100) in which embodiments of the present disclosure could be implemented. In general, the wireless system 100 enables multiple wireless or wired elements to communicate data and other content. The wireless system 100 may enable content (e.g., voice, data, video, text, etc.) to be communicated (e.g., via broadcast, narrowcast, user device to user device, etc.) among entities of the system 100. The wireless system 100 may operate by sharing resources such as bandwidth. The wireless system 100 may be suitable for wireless communications using 5G technology and/or later generation wireless technology (e.g., 6G or later). In some examples, the wireless system 100 may also accommodate some legacy wireless technology (e.g., 3G or 4G wireless technology).

In the example shown, the wireless system 100 includes electronic devices (ED) 110*a*-110*e* (generically referred to as ED 110), radio access networks (RANs) 120*a*-120*b* (generically referred to as RAN 120), a location management function (LMF) 180, a core network 130, a public switched telephone network (PSTN) 140, the internet 150, and other networks 160. In some examples, one or more of the networks may be omitted or replaced by a different type of network. Other networks may be included in the wireless system 100. Although certain numbers of these components or elements are shown in FIG. 1, any reasonable number of these components or elements may be included in the wireless system 100.

The EDs 110 are configured to operate, communicate, or both, in the wireless system 100. For example, the EDs 110 may be configured to transmit, receive, or both via wireless or wired communication channels. Each ED 110 represents any suitable end user device for wireless operation and may include such devices (or may be referred to) as a user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, a consumer electronics device, Internet of Things (IoT) device, wearable device, or vehicular device (or vehicle-mounted device, vehicle on-board equipment), among other possibilities. Future generation EDs 110 may be referred to using other terms.

In FIG. 1, the RANs 120 include base stations (BSs) 170*a*-170*f* (generically referred to as BS 170), respectively. Each BS 170 is configured to wirelessly interface with one or more of the EDs 110 to enable access to any other BS 170, the LMF 180, the core network 130, the PSTN 140, the internet 150, and/or the other networks 160. For example, the BS 170*s* may include (or be) one or more of several well-known devices, such as a base transceiver station (BTS), a radio base station, a Node-B (NodeB), an evolved NodeB (eNodeB), a Home eNodeB, a gNodeB (sometimes called a next-generation Node B), a transmission point (TP), a transmit and receive point (TRP), a site controller, an access point (AP), or a wireless router, among other possibilities. Future generation BSs 170 may be referred to using other terms. Any ED 110 may be alternatively or additionally configured to interface, access, or communicate with any other BS 170, the internet 150, the core network 130, the PSTN 140, the other networks 160, or any combination of the preceding. The wireless system 100 may include RANs, such as RAN 120*b*, wherein the corresponding BSs 170*d*-170*f* access the core network 130 via the internet 150, as shown.

The EDs 110 and BSs 170 are examples of communication equipment that can be configured to implement some or all of the functionality and/or embodiments described herein. In the embodiment shown in FIG. 1, the BSs 170*a*-170*c* forms part of the RAN 120*a*, which may include other BSs, base station controller(s) (BSC), radio network controller(s) (RNC), relay nodes, elements, and/or devices. Any BS 170 may be a single element, as shown, or multiple elements, distributed in the corresponding RAN, or otherwise. Also, the BSs 170*d*-170*f* form part of the RAN 120*b*, which may include other BSs, elements, and/or devices. Each BS 170 transmits and/or receives wireless signals within a particular geographic region or area, sometimes referred to as a "cell" or "coverage area". A cell may be further divided into cell sectors, and a BS 170 may, for example, employ multiple transceivers to provide service to multiple sectors. In some embodiments there may be established pico or femto cells where the radio access technology supports such. A macro cell may encompass one or more smaller cells. In some embodiments, multiple transceivers could be used for each cell, for example using multiple-input multiple-output (MIMO) technology. The number of RANs 120 shown is exemplary only. Any number of RANs may be contemplated when devising the wireless system 100.

The BSs 170 communicate with one or more of the EDs 110 over one or more air interfaces 190*a* using wireless communication links (e.g. radio frequency (RF), microwave, infrared (IR), etc.). The EDs 110 may also communicate directly with one another via one or more sidelink air interfaces 190*b*. The interfaces 190*a* and 190*b* may be generally referred to as air interfaces 190. BS-ED communications over interfaces 190*a* and ED-ED communications over interfaces 190*b* may use similar communication technology. The air interfaces 190 may utilize any suitable radio access technology. For example, the wireless system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190. The air interfaces 190 may utilize other higher dimension signal spaces, which may involve a combination of orthogonal and/or non-orthogonal dimensions.

The RANs 120 are in communication with the core network 130 to provide the EDs 110 with various services such as voice, data, and other services. The RANs 120 and/or the core network 130 may be in direct or indirect communication with one or more other RANs (not shown), which may or may not be directly served by core network 130, and may or may not employ the same radio access technology as RAN 120*a*, RAN 120*b* or both. The core network 130 may also serve as a gateway access between (i) the RANs 120 or EDs 110 or both, and (ii) other networks (such as the PSTN 140, the internet 150, and the other networks 160). In addition, some or all of the EDs 110 may include functionality for communicating with different wireless networks over different wireless links using different wireless technologies and/or protocols. Instead of wireless communication (or in addition thereto), the EDs 110 may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as Internet Protocol (IP), Transmission Control Protocol (TCP), User Datagram Protocol (UDP). EDs 110 may be multimode devices capable of operation according to multiple radio access technologies, and incorporate multiple transceivers necessary to support such.

LMF 180 is a physical or logical element that manages positioning for target devices, such as EDs 110. For example, LMF 180 may collect measurements and/or other location information, assist the target devices in calculating measurements, and estimate the target device location, as will be discussed in further detail herein. The wireless system 100 may include one or more LMF clients (not shown) that interact with the LMF 180 to obtain location information for targets devices. An LMF client may be implemented as a software and/or hardware element and may reside in a target device, for example. An LMF client may send a request to the LMF 180 to obtain positioning information. For example, a positioning request may originate from the target device or may originate from another device within the network, which could potentially be another user device (e.g., another ED 110) or a network node (e.g., BS 170). For example, LTE operates two positioning protocols via the radio network, namely LTE Positioning Protocol (LPP) and LPP Annex (LPPa). LPP is a point-to-point protocol for communication between an LMF serve (e.g., LMF 180) and a target device (e.g., ED 110), and is used to position the target device. In LTE, LPPa is a communication protocol between an eNodeB (e.g., BS 170) and an LMF (e.g., LMF 180) for control-plane positioning. In some cases, LPPa communication may be used to assist user-plane positioning by querying eNodeBs for information and measurements. Although the LMF 180 is shown as being a separate element that is in communication with the core network 130 in FIG. 1, in some implementations the LMF 180 may be implemented within the core network 130, e.g., as an Evolved Serving Mobile Location Center (E-SMLC) or a Secure User Plane Location Platform (SLP).

It is contemplated that the communication system 100 as illustrated in FIG. 1 may support a New Radio (NR) cell, which also may be referred to as hyper cell. Each NR cell includes one or more TRPs using the same NR cell ID. The NR cell ID is a logical assignment to all physical TRPs of the NR cell and may be carried in a broadcast synchronization signal. The NR cell may be dynamically configured. The boundary of the NR cell may be flexible and the system dynamically adds or removes TRPs to from the NR cell.

It is obviously understood that any number of NR cells may be implemented in the communication system 100. For example, FIG. 2 illustrates two neighboring NR cells in an example communication system, in accordance with an embodiment of the present disclosure.

Figure 2:
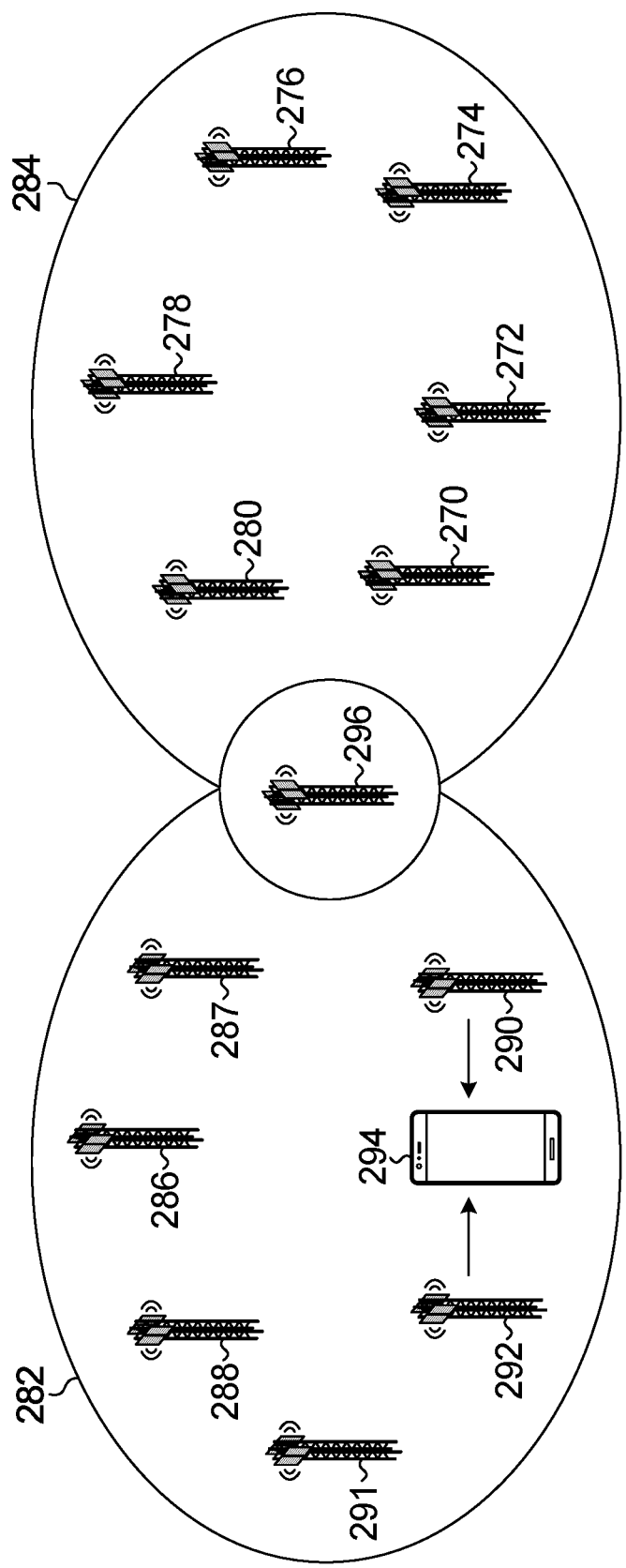
FIG. 2 illustrates two neighboring cells of an example communication system in which embodiments of the present disclosure could be implemented.

As illustrated in FIG. 2, NR cells 282, 284 each includes multiple TRPs that are assigned a same NR cell ID. For example, NR cell 282 includes TRPs 286, 287, 288, 289, 290, and 292, where TRPs 290, 292 communicates with an ED, such as UE 294. It is obviously understood that other TRPs in NR cell 282 may communicate with UE 294. NR cell 284 includes TRPs 270, 272, 274, 276, 278, and 280. TRP 296 is assigned to NR cells 282, 284 at different times, frequencies or spatial directions and the system may switch the NR cell ID for transmit point 296 between the two NR cells 282 and 284. It is contemplated that any number (including zero) of shared TRPs between NR cells may be implemented in the system.

In one embodiment, the system dynamically updates the NR cell topology to adapt to changes in network topology, load distribution, and/or UE distribution. In some implementations, if the concentration of UEs increases in one region, the system may dynamically expand the NR cell to include TRPs near the higher concentration of UEs. For example, the system may expand the NR cell to include other TRPs if the concentration of UEs located at the edge of the NR cell increases above a certain threshold. As another example, the system may expand the NR cell to include a greater concentration of UEs located between two hyper cells. In some implementations, if the traffic load increases significantly at one region, the system may also expand the NR cell associated with the region to include TRPs for the increased traffic load. For example, if the traffic load of a portion of the network exceeds a predetermined threshold, the system may change the NR cell ID of one or more TRPs that are transmitting to the impacted portion of the network.

In another embodiment, the system may change the NR cell ID associated with TRP 296 from the NR cell ID of NR cell 282 to the NR cell ID of NR cell 284. In one implementation, the system can change the association of a TRP with different NR cells periodically, such as every 1 millisecond. With such a flexible NR cell formation mechanism, all UEs can be served by the best TRPs so that there are substantially no UEs that are considered to be at a cell edge.

In yet another embodiment, the shared TRP 296 can reduce interference for UEs located at the boundary between the two NR cells 282, 284. UEs that are located near the boundaries of two NR cells 282, 284 experience less handovers because the shared TRP is associated with either NR cell at different times, frequencies or spatial directions. Further, as a UE moves between the NR cells 282, 284, the transition is a smoother experience for the user. In one embodiment, the network changes the NR cell ID of the TRP 296 to transition a UE moving between NR cells 282, 284.

The system may apply TRP selection techniques to minimize intra-NR cell interference and inter-NR cell interference. In one embodiment, a TRP sends a downlink channel state information (CSI)-reference signal (RS). Some pilot (also known as reference signal) ports may be defined such that the UEs can measure the channel state information and report it back to the network. A CSI-RS port is a pilot port defined as a set of known symbols from a sequence transmitted over known resource elements (for example OFDM resource elements) for UEs to measure the channel state. A UE assigned to measure a particular CSI-RS port can measure the transmitted CSI-RS sequence, measure the associated channel state and report it back to the network. The network, such as a controller, may select the best TRPs for all served UEs based on the downlink measurements. In another embodiment, a TRP detects an uplink sounding reference signal (SRS) sequence from a UE in the configured time-frequency resources. For example, Constant Amplitude Zero Auto Correlation (CAZAC) sequences such as Zadoff-Chu (ZC) sequences can be used as base sequences for SRS. The TRP reports a measurement of the detected uplink SRS sequence to the network, such as a controller. The controller then selects the optimal TRPs for all served UEs based on the measurements.

Figure 3A:
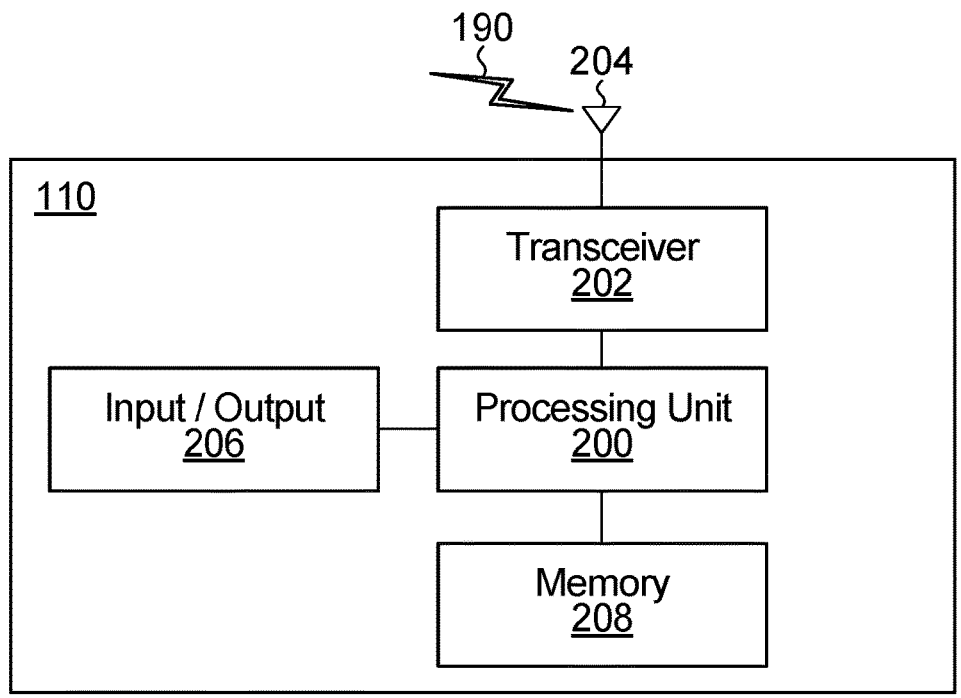
FIGS. 3A and 3B are block diagrams of an example electronic device (ED) and base station, respectively, that may implement the methods and teachings according to this disclosure.
Figure 3B:
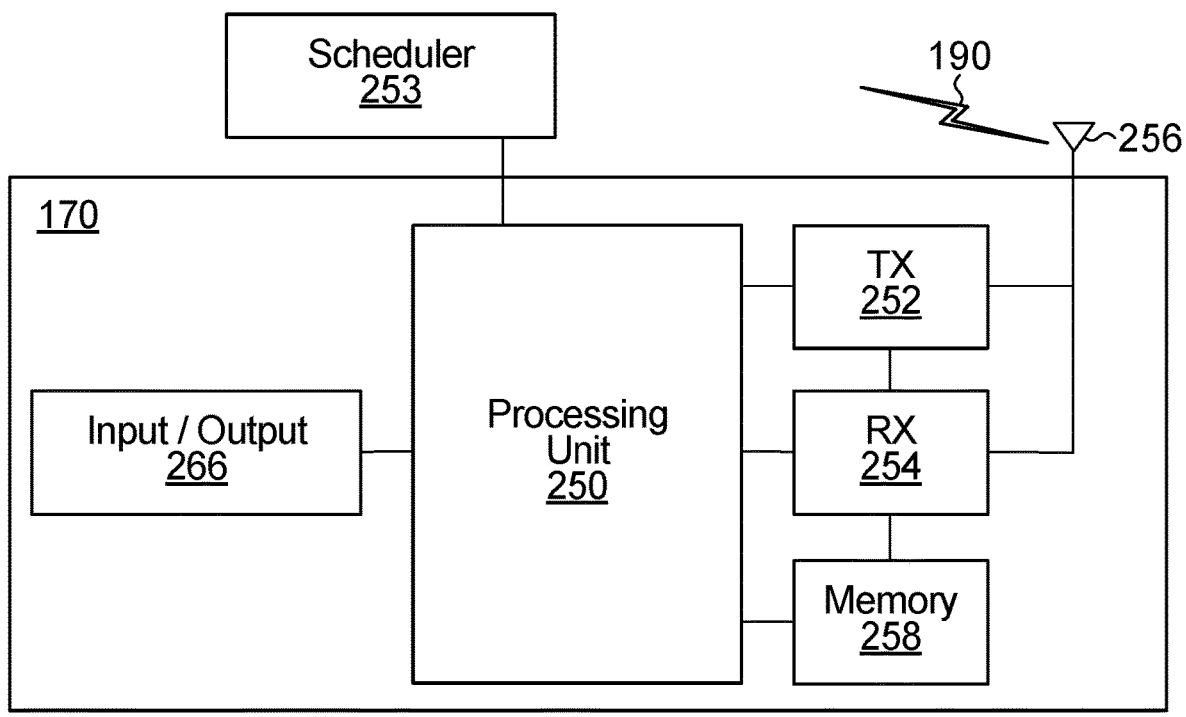

FIGS. 3A and 3B illustrate example devices that may implement the methods and teachings according to this disclosure. In particular, FIG. 3A illustrates an example ED 110, and FIG. 3B illustrates an example base station 170. These components could be used in the communication system 100 or in any other suitable system.

As shown in FIG. 3A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail elsewhere herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. For example, each antenna 204 may have a set of one or more antenna ports through which the antenna receives signals to transmit. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150 in FIG. 1). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3B, the base station 170 includes at least one processing unit 1350, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail herein. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110 in FIG. 3A. The memory 258 stores instructions and data used, generated, or collected by the base station 170. For example, the memory 258 could store software instructions or modules configured to implement some or all of the functionality and/or embodiments described herein and that are executed by the processing unit(s) 250.

Each input/output device 266 permits interaction with a user or other devices in the network. Each input/output device 266 includes any suitable structure for providing information to or receiving/providing information from a user, including network interface communications.

Figure 4:
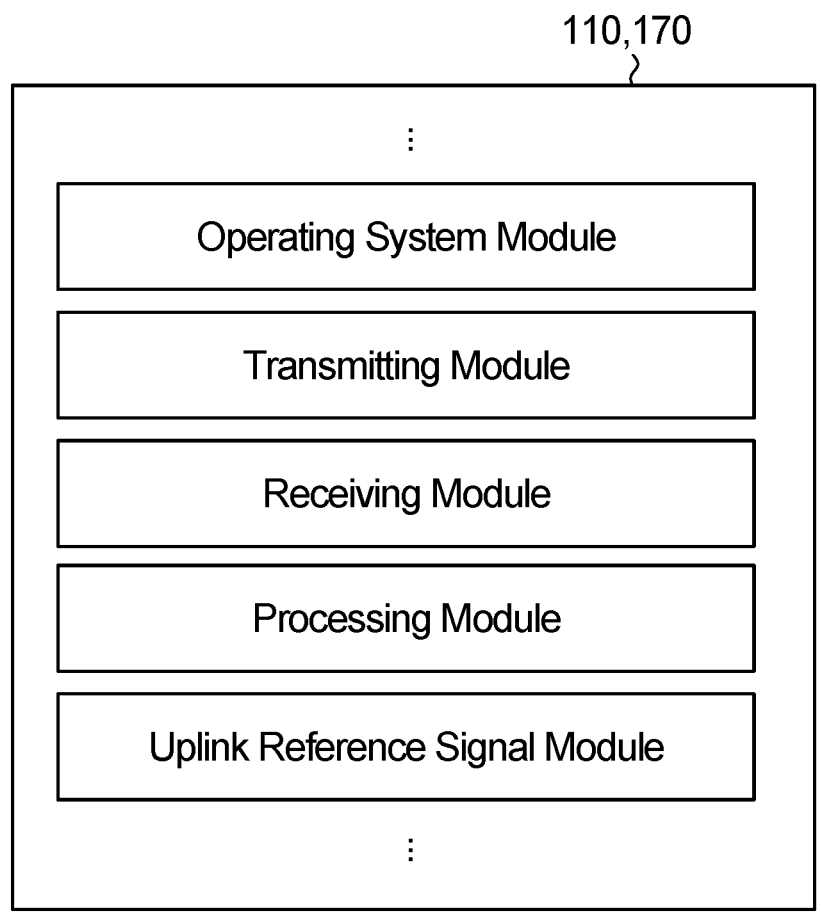
FIG. 4 is a block diagram of an example computing system that may implement the methods and teachings according to this disclosure.

It should be appreciated that one or more steps of the embodiment methods provided herein may be performed by corresponding units or modules, according to FIG. 4. For example, a signal may be transmitted by a transmitting unit or a transmitting module. A signal may be received by a receiving unit or a receiving module. A signal may be processed by a processing unit or a processing module. Other steps, such as those relating to uplink sounding reference signal carrier aggregation solutions described herein, may be performed by an uplink reference signal module. The respective units/modules may be implemented using hardware, one or more components or devices that execute software, or a combination thereof. For instance, one or more of the units/modules may be an integrated circuit, such as field programmable gate arrays (FPGAs) or application-specific integrated circuits (ASICs). It will be appreciated that where the modules are implemented using software for execution by a processor for example, they may be retrieved by a processor, in whole or part as needed, individually or together for processing, in single or multiple instances, and that the modules themselves may include instructions for further deployment and instantiation.

Additional details regarding the EDs such as 110 and base stations such as 170 are known to those of skill in the art. As such, these details are omitted here.

As discussed earlier, an increasing number of applications that rely on accurate and timely wireless-device positioning are being developed, and therefore there is an increasing demand for more accurate and reliable positioning. Uplink-based positioning solutions are based on the transmission of uplink (UL) sounding reference signals (SRSs) from a target device and measurements based on the received UL SRSs at network nodes in the radio access network (RAN), such as UL Reference Time of Arrival (RTOA), UL Angle of Arrival (AoA), and/or network node Reception-Transmission (Rx-Tx) time difference measurements, for example. The accuracy of such UL-based measurements has a direct relation with the bandwidth of the measured SRS. For example, in the current 3rd Generation Partnership Project (3GPP) Release 16 New Radio (NR) standard (hereinafter referred to as "Rel-16 NR"), the maximum size of an active BWP of a CC is limited to 400 MHz. However, in order to achieve a positioning accuracy on the order of 10 centimeters a measured SRS bandwidth of at least 1 GHz may be required.

SRS carrier aggregation (CA) has been proposed as a potential candidate method to increase the "effective" SRS BW. SRS CA involves the transmission of SRSs on multiple different carrier components, thereby effectively increasing the total effective SRS bandwidth to the sum of the active BWPs of the same or multiple different carrier components on which the SRSs are transmitted. However, in practice, in order to be able to use CA to increase the effective SRS BW for positioning purposes, the following two conditions may hold. Otherwise network nodes such as a gNB (next generation NodeB, in an example, it could be a node that provides NR user plane and control plane protocol terminations towards the UE), a NG-RAN node, a BS, a TP, a TRP, a RP, a positioning TRP, or a cell, cannot coherently combine SRSs of different CCs and the increase in the "effective" SRS BW will not be achieved.

Condition 1: UE is able to transmit SRS on different carrier components on the same antenna port However, a UE cannot typically ensure, or is not expected to ensure, that "phase continuity" is maintained across different CCs, or even within one CC but across different slots, or even within one slot of one CC when there is UL transmission interruption or when there is a change in one or more transmission parameters (such as transmit power, for example).

Unless a UE has the capability of maintaining "phase continuity", the UE cannot transmit SRSs on different CCs from the same antenna port. As discussed in further detail later on, one aspect of the present disclosure provides a capability signaling mechanism by which a UE can indicate to the network its capability to maintain phase continuity, or equivalently the capability to transmit SRSs on different CCs from the same antenna port.

Condition 2: Some transmission characteristics of SRSs (such as subcarrier spacing, spatial transmission filter, or other parameters that will be discussed later in this document) in different CCs may be the same to be able to transmit SRSs on the same antenna port However, in the current 3GPP Rel-16 NR standard, the only method to satisfy Condition 2 is to configure/reconfigure SRSs on different CCs with the same set of RRC configuration parameters. Such an approach requires a large amount of higher-layer signaling, UE battery drainage, large latency, and unnecessary SRS transmission occasions. An example of this is illustrated in FIG. 5, which shows an example of SRS CA involving three CCs, CC1-CC3, and four SRSs, SRS1-SRS4, configured via RRC signaling such that SRS1 in CC1 and SRS3 in CC2 are transmitted on one common antenna port and SRS2 in CC3 and SRS4 in CC2 are transmitted on another common antenna port.

Figure 5:
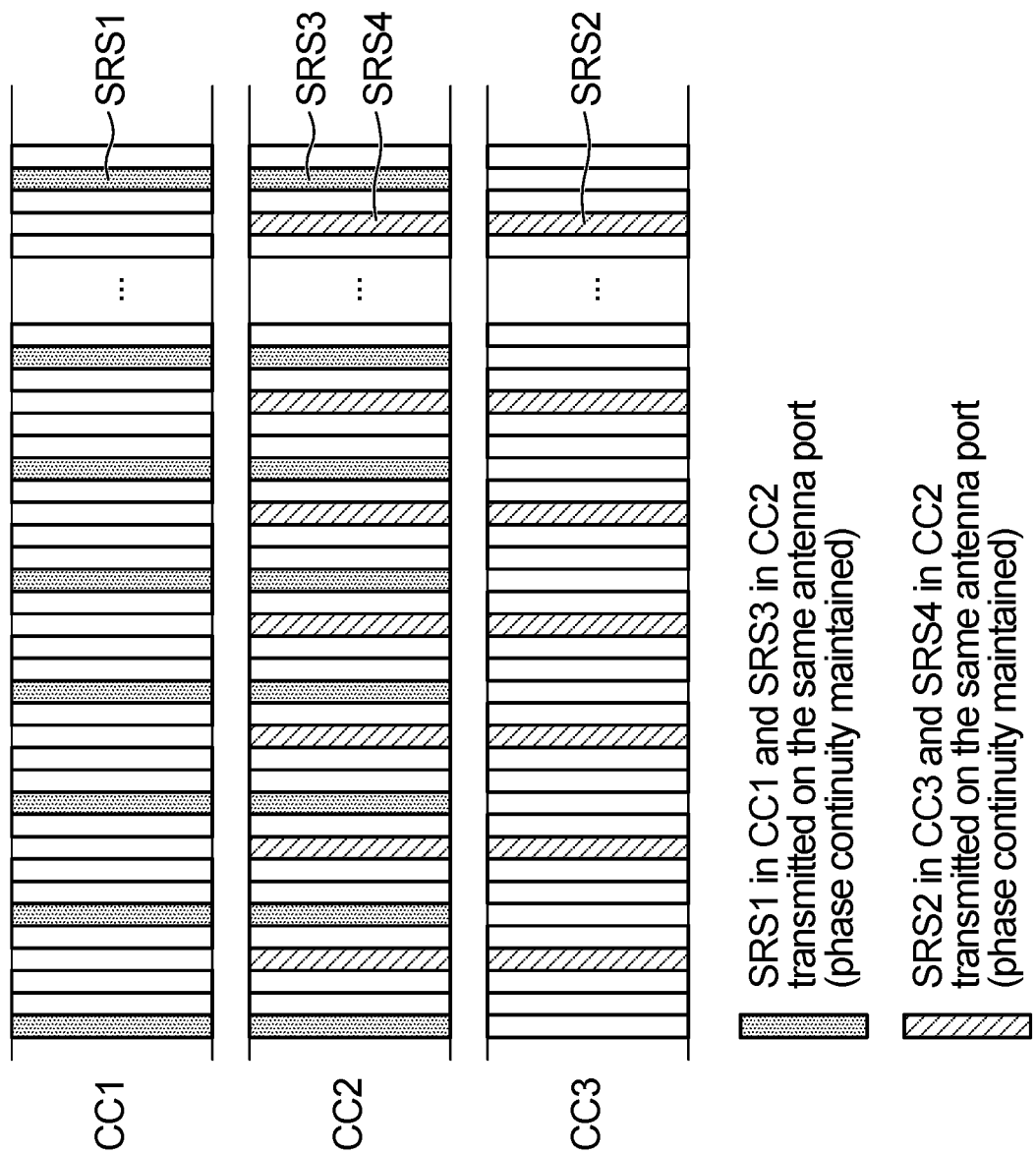
FIG. 5 illustrates an example of sounding reference signal carrier aggregation.

As shown in FIG. 5, if SRS1 in CC1 and SRS2 is CC3 require BW boost, two additional SRSs (in this example, SRS3 and SRS4 in CC2) are configured and transmitted. So, essentially, 4 SRS on three CCs must be configured and transmitted in this example. In general, if N SRSs need BW boost from only one other CC, overall, 2N SRSs have to be configured and transmitted, where N is an integer larger than zero. This results in large higher-layer signaling overhead, UE battery drainage, and UL RS overhead. Note that, in the above example, it may be possible to only configure SRS3 to boost BW of SRS1 and then reconfigure SRS3 to SRS4 to boost bandwidth of SRS2 to reduce UE battery drainage. However, this does not reduce higher-layer signaling overhead and also introduces latency since there is no response time requirement for the UE to apply an SRS reconfiguration message received in RRC.

Aspects of the present disclosure address one or more of the technical problems associated with achieving Condition 1 or Condition 2 discussed above.

Turning first to achieving Condition 1, the basic concept of the present disclosure with regards to addressing the technical problems of Condition 1, is to provide capability signaling from a UE to the network (e.g., to a gNB/BS or LMF) to indicate the UE's capabilities with respect to supporting SRS CA.

As discussed above, in order to effectively increase the SRS BW, a UE may have the capability (referred to hereinafter as "Capability A") to transmit N (N>=2) SRS resources (resource sets) on N carrier components (cells) each on a different carrier component (cell), such that the N SRS resources (or resource sets) are transmitted on the same set of antenna ports. Here it is noted that a resource set is comprised of several resources that are typically transmitted in different directions. For example, in Rel-16 NR, there is a SRS Resource set that includes multiple SRS Resources that are each transmitted in a different direction. A SRS Resource is transmitted in a particular direction while a SRS Resource set covers multiple directions by virtue of the multiple SRS Resources that are included in the SRS Resource set.

In some embodiments of the present disclosure, a UE may signal to the network that Capability A is supported by signaling at least one of the following capabilities or features to the network (e.g., to a gNB using RRC protocol or LMF using LPP (or both)):

C1) Support for N power amplifier structure;
C2) Support for phase continuity;
C3) Support for phase continuity for SRS;
C4) Support for same antenna port transmission;
C5) Support for same set of antenna ports transmission;
C6) Support for same antenna port transmission for SRS; or
C7) Support for same antenna set of ports transmission for SRS;

The above capability signals can be for intra-band UL CA or inter-band UL CA. Above capabilities can be signaled per band, per band combination, per band per band combination (per feature set), per band combination with single band, or per CC per band per band combination.

If network is notified that Capability A is supported by the UE, then network can indicate to the UE to transmit N (N>=2) SRS resources (resource sets) on N different carrier components such that N SRS resources (resource sets) are transmitted on the same set of antenna ports. Note that this feature may be conditional on the presence of (or being enabled or being supported) a RRC parameter that indicates SRS on different carrier components can be transmitted from the same set of antenna ports. The indication from the network to the UE can be using at least one of the Example Embodiments 1 to 8 that are discussed below, for example.

Turning now to addressing the technical problems of Condition 2, the basic concept of the present disclosure with regards to addressing the technical problems of Condition 2 is to use lower layer signaling, such as medium access control-control element (MAC-CE) or dynamic control information (DCI) messaging, to activate/update or trigger one or multiple SRSs that are already configured using higher layer signaling, such as RRC signaling, such that the activated/updated or triggered SRSs are transmitted on the same set of one or more antenna ports (a set of antenna ports can be only one antenna port). The common set of antenna ports can be the same set of antenna ports that a reference SRS is transmitted on. The reference SRS can be one of the activated/updated or triggered SRSs or can be a SRS that does not belong to the set of activated/updated or triggered SRS via the lower layer signaling (e.g., via MAC-CE or DCI messaging).

Figure 6:
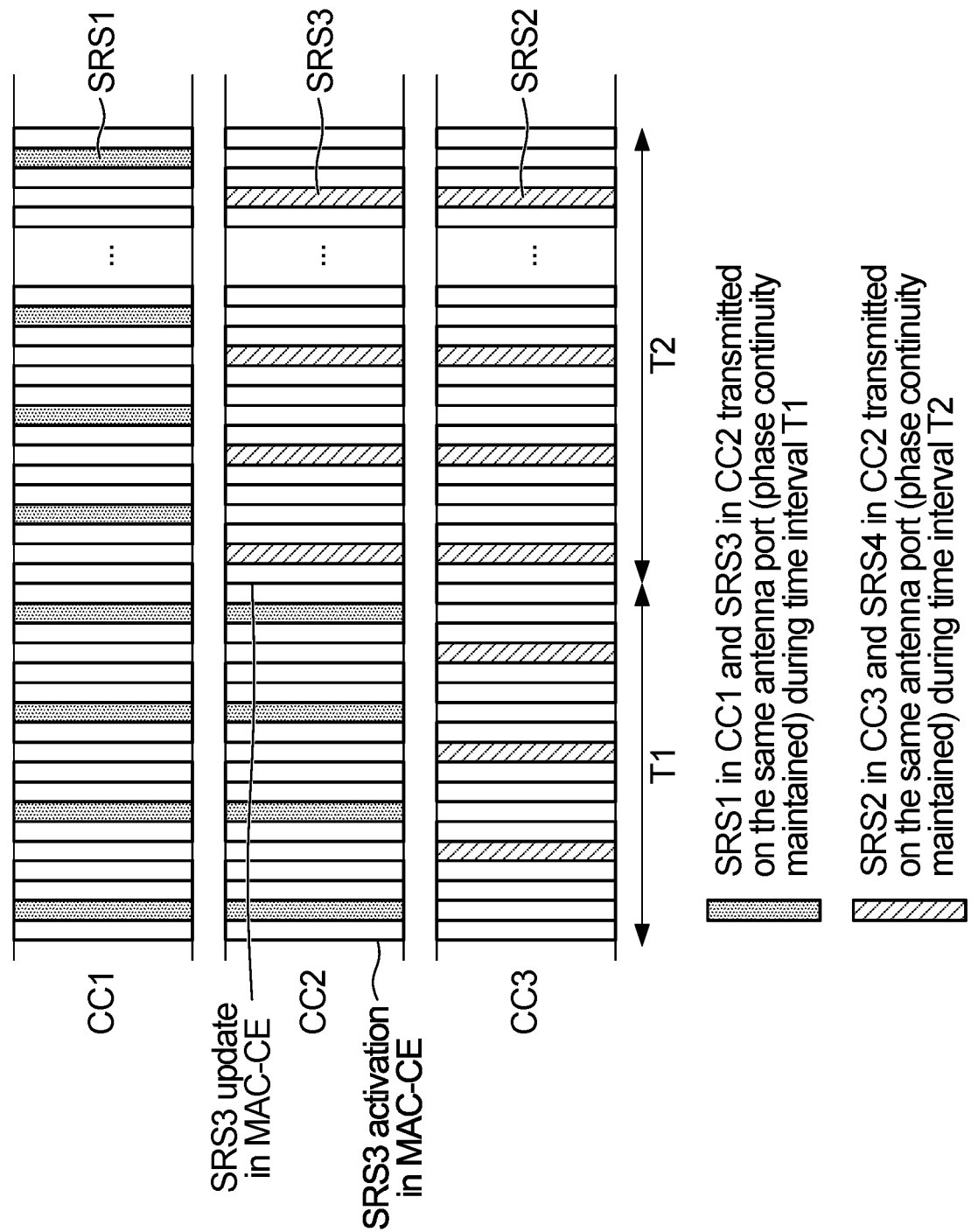
FIG. 6 illustrates an example of sounding reference signal carrier aggregation according to an embodiment of the present disclosure.

To further clarify the basic concept of this aspect of the present disclosure with regards to addressing the technical problems of Condition 2, FIG. 6 illustrates an example of SRS CA in accordance with a simple embodiment of the present disclosure that provides a contrast with the conventional approach to SRS CA shown in FIG. 5.

In particular, FIG. 6 shows an example of SRS CA involving three CCs, CC1-CC3, and three SRSs, SRS1-SRS3 in accordance with an embodiment of the present disclosure. In this embodiment, SRS1 and SRS2 are reference SRSs and SRS3 is a target SRS. Target SRS3 in CC2 is activated in MAC-CE with reference SRS1 in CC1 and then is updated in MAC-CE with reference SRS2 in CC3 after time interval T1. Note that, target SRS and reference SRS are transmitted on the same antenna port which means that SRS1 and SRS3 are transmitted on the same antenna port during time interval T1 and SRS2 and SRS3 are transmitted on the same antenna port during time interval T2. In this example, three SRS on three CCs are configured and transmitted. In general, if N SRSs need BW boost from only one other CC, overall, N+1 SRSs may be configured and transmitted (in contrast to the 2N SRSs that are configured and transmitted in FIG. 5).

Note that, activation/update message overrides some of the target SRS configuration parameters by the corresponding reference RS configuration parameters. For example, this means that the activation of SRS3 in MAC-CE causes some configuration parameters of SRS3 to be overridden with corresponding configuration parameters of SRS1 during the time interval T1. A similar overriding of configuration parameters of SRS3 with corresponding configuration parameters of SRS2 is caused by the update to SRS3 in MAC-CE for the time interval T2. Non-limiting examples of configuration parameters that may be overridden are discussed in further detail later on.

It is noted that the example embodiment shown in FIG. 6 is one very simple embodiment of one aspect of the present disclosure. Further detailed embodiments are discussed below with reference to FIGS. 7 and 8 and Example Embodiments 1 to 8.

However, before further discussion, the following notes are provided that are generally applicable to aspects of the present disclosure:

Note 1: The set of antenna ports may comprise only one antenna port.

Note 2: For Capability A to be supported, the phase continuity may be maintained among the N SRS resources (resource sets).

Note 3: An extended definition of transmission on the same set of antenna ports for two different SRS resource sets has been used for the ease of presentation. In the present disclosure, if SRS resource set 1 and SRS resource set 2 are said to be transmitted on the same set of antenna ports, it means that:

SRS resource set 1 and SRS resource set 2 both have M SRS resources; and

SRS resource j of SRS resource set 1 and SRS resource j of SRS resource set 2 are transmitted on the same set of antenna ports for j=1, ..., M while different SRS resources of the same SRS resource set may or may not be transmitted on the same set of antenna ports.

Note 4: The word SRS can mean SRS resource or SRS resource set. Moreover, SRS in this document may refer to SRS for positioning or SRS for MIMO usages. In Rel-16 NR, SRS resources and resources sets for positioning are configured by SRS-PosResource-r16 and SRS-PosResourceSet-r16, respectively. SRS resources and resource sets for MIMO usages are configured by SRS-Resource and SRS-ResourceSet, respectively.

Note 5: In the embodiments that involve reference SRS resource (set) and target SRS resource (set), there is one reference SRS resource (set) and N−1 (N>=2) target SRS resources (resource sets). The target SRS resources (resource sets) are transmitted on the same set of antenna ports as the reference SRS resource set. Both reference and target SRSs are either both SRS resource sets or both SRS resources. That is, target (reference) SRS cannot be a SRS resource while reference (target) SRS is a SRS resource set.

Note 6: It is to be understood that the example communication protocols mentioned in connection with the following example embodiments (e.g., radio resource control (RRC), LTE positioning protocol (LPP), and new radio positioning protocol a (NRPPa)) are merely examples of communication protocols that may be utilized in some embodiments and other protocols may be used in other embodiments now and/or in the future. For instance, RRC may be replaced by any other protocol that is terminated between a BS (e.g., gNB) and the target device (e.g., UE) to transport radio resource messages where the BS may itself be replaced by any node that is connected to the core network and provides user plane and control plane protocol terminations towards the target device. LPP may be replaced by any other protocol that is terminated between a target device and a positioning server (e.g., LMF). It may use either the control- or user-plane protocols as underlying transport. In turn, NRPPa may be replaced by any other protocol that carries information between a BS and a positioning server. Finally, note that SRS configuration may be provided using LPP from LMF in the future instead of using RRC from the serving gNB.

It should be noted that when two SRS resources (resource sets) (e.g., a target SRS resource (set) and a reference SRS resource (set)) are transmitted on the same set of antenna ports, they are transmitted with the same value for some of the configuration parameters (Information Elements (IEs)/ fields). In some embodiments, the same value is used for a configuration parameter "Param" of the target SRS resource (set) and the reference SRS resource (set), based on one of the following two methods:

- The UE expects to be configured with the same value for "Param" in the target SRS resource (set) and the reference SRS resource (set) configuration.
- The value of "Param" in the configuration of the target SRS resource (set) is overridden by the value of "Param" in the configuration of the reference SRS resource (set).

In one example, the target SRS resource (set) and the reference SRS resource (set) are transmitted with the same value for one of, or any subset of, or all of the following configuration parameters (IEs/fields):

Parameter $\alpha_{O,SRS,b,f,c}(q_s)$ which multiplies with the downlink (DL) pathloss estimate in SRS transmit power expression as explained in Clause 7.3 of 3GPP Technical Specification (TS) 38.213. In Rel-16 NR, this parameter is provided in RRC configuration by alpha or alpha-r16.

Parameter $P_{O,SRS,b,f,c}(q_s)$ in SRS transmit power expression as explained in Clause 7.3 of 3GPP TS 38.213. In Rel-16 NR, this parameter is provided in RRC configuration by p0 or p0-r16.

Pathloss reference RS $q_d$ that is used to obtain DL pathloss estimate and is explained in clause 7.3 of 3GPP TS 38.213 and can be a synchronization signal-physical broadcast channel block (SS-PBCH block, SSB), CSI-RS, or a DL positioning reference signal (PRS). In Rel-16 NR, pathloss reference RS is provided in RRC configuration by an IE of a path loss reference RS, e.g., PathlossReferenceRS, pathlossReferenceRS-Pos-r16 or pathlossReferenceRS-List-r16.

Spatial relation reference RS that can be a SSB, CSI-RS, DL PRS, or a SRS resource and determines the spatial domain transmission filter used for the transmission of the SRS resource. If the spatial relation reference RS that is provided in the configuration of the SRS resource "A" is a SSB, CSI-RS, or DL PRS, the UE may transmit the SRS resource "A" with the same spatial domain transmission filter used for the reception of the reference SSB, CSI-RS, or DL PRS, respectively. If the spatial relation reference RS that is provided in the configuration of the SRS resource "A" is another SRS resource, the UE may transmit the SRS resource "A" with the same spatial domain transmission filter used for the transmission of the reference SRS resource. In Rel-16 NR, the ID or the configuration of the spatial relation reference RS (SSB, CSI-RS, DL PRS, or a SRS resource) is provided in RRC configuration of the SRS resource by spatialRelationInfo or spatialRelationInfoPos-r16. In some examples, the spatial relation reference RS provided in the configuration of the target SRS resource is the reference RS resource.

Time domain behavior of the SRS resource (set) that can be periodic, semi-persistent, or aperiodic. In Rel-16 NR, time domain behavior of the SRS resource (set) is indicated by the RRC parameter resourceType or resourceType-r16.

Number of SRS ports. In Rel-16 NR, Number of SRS ports is defined by the RRC parameter nrofSRS-Ports.

Transmission comb value. In Rel-16 NR, transmission comb value is defined by the higher layer parameter transmissionComb or transmissionComb-r16.

Cyclic shift. In Rel-16 NR, Cyclic shift is defined by the higher layer parameter cyclicShift-n2-r16, cyclicShift-n4-r16, cyclicShift-n8-r16, cyclicShift-n2, or cyclicShift-n4.

Number of OFDM symbols in the SRS resource. In Rel-16 NR, Number of OFDM symbols in the SRS resource is provided by nrofSymbols-r16 in the higher layer parameter resourceMapping-r16 or by nrofSymbols in the higher layer parameter resourceMapping.

Starting OFDM symbol of the SRS resource within a slot. In Rel-16 NR, starting OFDM symbol of the SRS resource within a slot is provided by startPosition-r16 in the higher layer parameter resourceMapping-r16 or by startPosition in the higher layer parameter resourceMapping.

Repetition factor R. In Rel-16 NR, repetition factor is provided in repetitionFactor.

Group or sequence hopping. In Rel-16 NR, Group or sequence hopping is provided by groupOrSequenceHopping or groupOrSequenceHopping-r16.

Slot level Periodicity. In Rel-16 NR, periodicity is provided by the higher layer parameters periodicityAndOffset-p or periodicityAndOffset-p-r16 for a periodic SRS resource or periodicityAndOffset-sp or periodicityAndOffset-sp-r16 for semi-persistent SRS resource set.

Slot level offset. In Rel-16 NR, offset is provided by the higher layer parameters periodicityAndOffset-p or periodicityAndOffset-p-r16 for a periodic SRS resource, periodicityAndOffset-sp or periodicityAndOffset-sp-r16 for semi-persistent SRS resource, or slotOffset or slotOffset-r16 for aperiodic SRS resource set or aperiodic SRS resource.

SRS sequence ID. In Rel-16 NR, SRS sequence ID is defined by the higher layer parameter sequenceId or sequenceId-r16.

In one example, the target SRS resource (set) and the reference SRS resource (set) are transmitted with the same transmit power as indicated in Clause 7.3 of 3GPP TS 38.213.

For the case of intra-band CA when the reference SRS resource (set) and target SRS resource (set) are respectively on neighboring carrier components c1 and c2, the UE may transmit SRS on at least part of the guard band between c1 and c2.

The SRS on the guard band between c1 and c2 is transmitted on the same set of antenna ports as the reference and target SRS resource (set).

In one example, the starting PRB and the bandwidth of the reference SRS resource (set) are configured so that a part of the reference SRS resource (set) is transmitted in at least part of the guard band between c1 and c2.

In one example, the starting PRB and the bandwidth of the target SRS resource (set) are configured so that a part of the target SRS resource (set) is transmitted in at least part of the guard band between c1 and c2.

Figure 7:
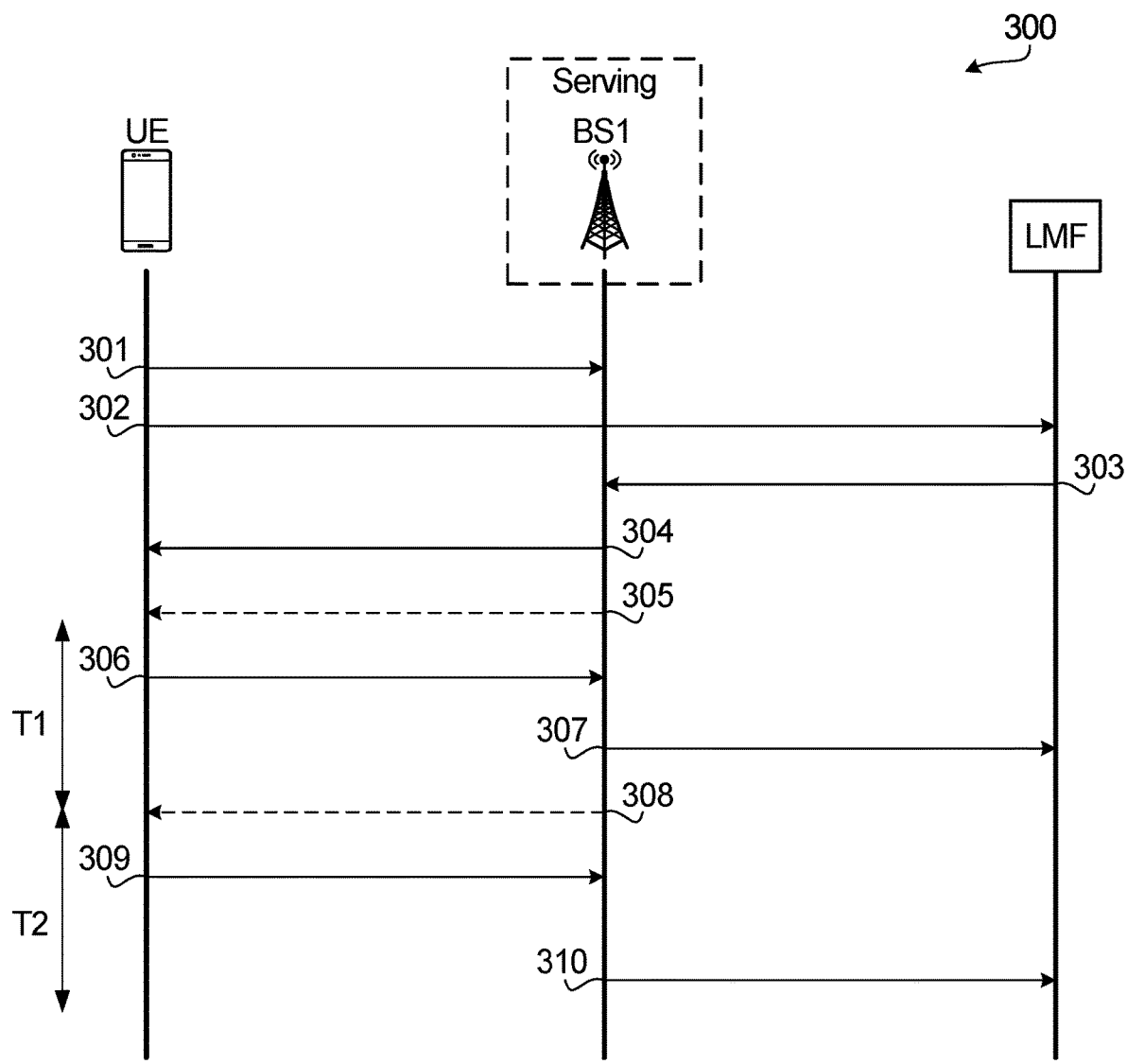
FIG. 7 illustrates an example signal flow diagram according to an embodiment of the present disclosure.

FIG. 7 is a signal flow diagram 300 of an example of an over the air information exchange procedure for UL-based positioning using SRS CA configured and activated in accordance with an embodiment of this disclosure.

In the signal flow diagram 300, a target device, a serving BS (BS1) for the target device and a LMF are involved in an information exchange for UL-based positioning of the target device, which in this example is a UE. A serving BS may be defined as the BS that a target device is connected to and that provides the target device with data and control signaling. In contrast, there may be no direct data or control signaling between the neighboring (non-serving) BSs and the target device. In general, a target device, such as a UE, can perform measurements on some DL reference signals (RSs) transmitted from non-serving BSs, and the non-serving BSs may be able to receive and measure some uplink (UL) RSs from the UE. RS configuration information may be exchanged in order to assist/configure the target device and/or the neighboring BSs to transmit such transmissions (DL RS/UL RS) at the transmitting device (BS/target device) and/or to make corresponding measurements at the receiving device (target device/BS). However, RS configuration information may not be directly communicated between the neighboring BSs and the target device. Instead, these configurations may be indirectly communicated between a target device and neighboring BSs through a third network node such as the serving BS or some other network function such as a LMF.

Although only one UE, one serving BS and one LMF are shown in FIG. 5 to avoid congestion in the drawing, data collection or information sharing during positioning, and similarly operation of a communication network, may involve any number of UEs, any number of serving and non-serving BSs and any number of LMFs. For example, in some embodiments positioning may be done with the joint efforts from multiple network devices and multiple UEs and positioning may be done on a per UE basis.

The information exchange procedure begins with the UE sending information indicating an SRS capability of the UE to the BS at 301 and/or to the LMF at 302. The SRS capability information sent by the UE may indicate whether the UE is capable of transmitting N SRSs (N≥2) on N carrier components each on a different carrier component on a same set of at least one antenna port, for example. In some embodiments, the SRS capability information may include information identifying one or more of the capabilities or features C1)-C7) discussed above. In some embodiments, the SRS capability information may be sent to the serving BS and/or the LMF in response to receiving a request (not shown) from the BS and/or the LMF. In some embodiments, the SRS capability information may be transmitted by the UE to the serving base station using RRC protocol and/or to the LMF using LPP protocol.

At 303, the LMF may transmit a message to the serving BS that includes the SRS capability information that the LMF received from the UE. In some embodiments, the messaging between the LMF and the serving base station at 303 may be transmitted using the NRPPa protocol, for example. In some embodiments, this step may be omitted if the UE provides its SRS capability information directly to the serving BS. In some embodiments, the serving BS and/or the LMF may share the SRS capability information of the UE with one or more non-serving BSs (not shown).

After receiving SRS capability information for the UE indicating that the UE the UE is capable of transmitting N SRSs on N carrier components each on a different carrier component on a same set of at least one antenna port, the BS sends higher layer signaling to the UE at 304 that includes SRS configuration information for a plurality of SRSs. In some embodiments, the higher layer signaling at 304 may be transmitted using the RRC protocol, for example. In some other embodiments, after receiving SRS capability information for the UE indicating that the UE the UE is capable of transmitting N SRSs on N carrier components each on a different carrier component on a same set of at least one antenna port, the LMF sends higher layer signaling to the UE that includes SRS configuration information for a plurality of SRSs. In some embodiments, the higher layer signaling may be transmitted using the LPP, for example (not shown in the figure).

At 305, the BS send lower layer signaling to the UE that includes information associating N−1 target SRS from the plurality of SRSs with a reference SRS from the plurality of SRSs, wherein N is an integer and The lower layer signaling transmitted by the BS at 305 causes configuration parameters for the associated N−1 target SRS to be overridden with corresponding configuration parameters for the reference SRS. These configuration parameters may include one or more of the configuration parameters discussed above, for example. Here it is noted that the term "SRS" as used herein may refer to an SRS resource or a SRS resource set that includes multiple SRS resources. In some embodiments, the lower layer signaling at 305 may comprise a MAC-CE message or a DCI message, for example. In some embodiments, the lower layer signaling from the BS to the UE is based on a request from the LMF to BS (the request is not shown in the figure). In some embodiments, the above request is transmitted using NRPPa protocol for example.

At 306, the UE transmits the reference SRS and the associated N−1 target SRS to the serving BS. The N SRSs transmitted by the UE at 306, which include the reference SRS and the associated N−1 target SRS, are transmitted on N different respective CCs on a same set of one or more antenna ports such that the N SRSs transmitted on N CCs are coherently combinable. For example, referring again to FIG. 6, in some embodiments N is equal to 2 and the transmission of N SRS at 306 may involve transmitting a reference SRS1 on CC1 and a target SRS3 on CC2 during a first time interval T1.

In some embodiments, at 307 the serving BS may send measurements that are obtained from the received SRSs to the LMF to process and derive the position of the UE. In some embodiments, the measurements may include one or more of the measurements discussed previously, such as UL RTOA, UL AoA and/or BS Rx-Tx time difference measurements, for example. In some embodiments, the measurement information may be transmitted to the LMF using the NRPPa protocol, for example.

In some embodiments, the serving BS at 308 transmits further lower layer signaling to the UE in order to update the SRS CA configuration of the UE. This may involve changing the reference SRS and/or the associated target SRS. For example, referring again to FIG. 6, in some embodiments the lower layer signaling transmitted at 305 may have activated target SRS3 in CC2 with reference SRS1 in CC1, and the lower layer signaling transmitted at 308 may update the SRS CA configuration to activate the target SRS3 in CC2 with reference SRS2 in CC3 after time interval T1. Target SRS and reference SRS are transmitted on the same set of one or more antenna ports which means that in such embodiments SRS1 and SRS3 would be transmitted on the same set of one or more antenna ports during time interval T1 and SRS2 and SRS3 would be transmitted on the same set of one or more antenna ports during time interval T2. Although in this example the number of target SRS associated with a reference SRS is the same in both SRS CA configurations (i.e., one target SRS (SRS3) is associated with reference SRS1 during time interval T1 and one target SRS (SRS3) is associated with reference SRS2 during time interval T2), more generally the number of target SRS associated with a reference SRS for SRS CA may be the same or different in different SRS CA configurations.

For example, in some embodiments, the lower layer signaling transmitted to the UE at 305 may associate N−1 target SRS from the plurality of SRSs with a first reference SRS from the plurality of SRSs, and the lower layer signaling transmitted to the UE at 308 may associate P−1 target SRS from the plurality of SRSs with a second reference SRS from the plurality of SRSs, wherein P is an integer, P≥2 and P may be different from N. In such embodiments, configuration parameters for the associated P−1 target SRS may be overridden with corresponding configuration parameters for the second reference SRS based at least in part on the information included in the lower layer signaling at 308. At 309, the UE transmits the P SRSs, inclusive of the second reference SRS and the associated P−1 target SRS, on P different respective CCs on a same set of one or more antenna ports such that the P SRSs transmitted on P CCs are coherently combinable. In some embodiments, the P−1 target SRS includes at least one of the N−1 target SRS.

In some embodiments, at 310 the serving BS may send measurements that are obtained from the received SRSs to the LMF to process and derive the position of the UE.

It should be noted that in some embodiments some of the above steps are optional and may be present only in some positioning sessions. For example, a target device may not need to signal its SRS CA capability in every positioning session.

In some embodiments, the same message may be used for carrying out two different steps of the procedure. For example, the lower layer signaling of steps 305 and 308 may use the same MAC-CE message or DCI command. As another example, the measurement information reporting messages 307 and 310 may be provided in the same IE.

Potential technical benefit(s)/advantage(s) of the example embodiment shown in FIG. 7 include, but are not necessarily limited to, increasing effective SRS BW through transmission of N (N>=2) SRS on the same antenna port (or the same set of antenna ports) on N carrier components, which may improve positioning measurement accuracy. Also, this embodiments reduces the higher-layer (RRC) configuration signaling by activating/updating or triggering target SRS(s) in lower layer signaling (e.g., MAC-CE or DCI) and overriding some configuration parameters of the target SRS(s) by the corresponding configuration parameters of the reference SRS. Furthermore, this reduces UL RS overhead and battery drainage by updating or triggering one active SRS in lower layer signaling instead of transmitting multiple SRS configurations in higher layer signaling.

In general, aspects of the present disclosure improve the accuracy of UL-based (e.g., UL-AoA/UL-TDoA) and joint UL/DL-based (Multi-RTT) RAT-dependent positioning solutions, and therefore potentially provide a viable alternative for positioning even for macro urban scenarios. Moreover, while the present disclosure provides benefits to positioning applications, it can be used in any other technology that requires larger SRS bandwidth than the bandwidth of the configured BWP or carrier component. This includes SRS for MIMO usages (including SRS for beamforming, beam management, and CSI acquisition) and SRS for mobility purposes.

Non-limiting examples of techniques that may be used to indicate the target and reference SRSs to a UE will now be described with reference to several Example Embodiments. These techniques may be used to determine the content of the configuration/activation information included in the messaging at steps 304, 305 and/or 308 of FIG. 7, for example.

In a first example embodiment, the higher layer and lower layer signaling utilized to indicate the target and reference SRSs that are to be used by a UE for SRS CA include:
  A) A list of target SRS resources (resource sets) candidates or their corresponding serving cell IDs are provided in RRC.
  B) The group of SRS resources (resource sets) that are to be transmitted on the same set of antenna ports as their corresponding reference SRS resource (set) are directly, or through indication of their corresponding serving cells, indicated/updated in MAC-CE or DCI. In some embodiments, the group of SRS resources (resource sets) in B) is selected from the provided list of target SRS resources (resource sets) candidates or their corresponding serving cell IDs. In some embodiments, the group size excluding the reference SRS resource (set) is N−1 (N≥2).

Potential technical benefit(s)/advantage(s) of Example Embodiment 1 include, but are not necessarily limited to enabling a group of target SRS to be activated/updated in MAC-CE/DCI for each reference SRS resource (set) without any need for RRC re-configuration. Therefore, a reference SRS resource (set) can have a flexible set of target SRS resources (resource sets) that can be updated by MAC-CE/DCI. Similarly, a target SRS resource (set) may be activated/triggered with a new reference SRS resource (set) by MAC-CE/DCI message without any need for RRC reconfiguration.

In a second example embodiment, the higher layer and lower layer signaling utilized to indicate the target and reference SRSs that are to be used by a UE for SRS CA include:
  A) A list of reference SRS resource (set) candidates is provided in the target SRS resource (set) configuration in RRC. Each reference SRS resource (set) candidate is indicated in RRC at least with its serving cell ID, BWP Id, and SRS resource (set) ID.
  B) MAC-CE indicates or updates one of the reference SRS resource (set) candidates as the reference for the target SRS resource (set).

Potential technical benefit(s)/advantage(s) of Example Embodiment 2 include, but are not necessarily limited to enabling a reference SRS resource (set) to be activated/updated for each target SRS resource (set) in MAC-CE/DCI from a list of pre-configured reference SRS resource (set) candidates without any need for RRC re-configuration. It is noted that one SRS resource (set) can be a reference SRS resource (set) for more than one target SRS resource (set).

In a third example embodiment, the higher layer and lower layer signaling utilized to indicate the target and reference SRSs that are to be used by a UE for SRS CA include:
- A) A list of target SRS resource (set) candidates is provided in the reference SRS resource (set) configuration in RRC. Each target SRS resource (set) is indicated in RRC with at least its serving cell ID, BWP Id, and SRS resource (set) ID.
- B) MAC-CE indicates or updates N−1 target SRS resource (set) candidates as the target for the reference SRS resource (set).

Potential technical benefit(s)/advantage(s) of Example Embodiment 3 include, but are not necessarily limited to enabling a group of N−1 SRS resources (resource sets) to be activated/updated for each reference SRS resource (set) in MAC-CE/DCI from a list of pre-configured target SRS resource (set) candidates without any need for RRC re-configuration. It is noted that one SRS resource (set) can be a target candidate for more than one reference SRS resource (set) as long as it is not activated/triggered for more than one reference SRS resource (set) at any time interval.

In a fourth example embodiment, the higher layer and lower layer signaling utilized to indicate the target and reference SRSs that are to be used by a UE for SRS CA include:
- A) A list of M serving cell indices are provided in RRC (M>=N)
- B) MAC-CE or DCI indicated N out of the M provided cells. The SRS resource resources (resource sets) with the same ID in the indicated N serving cells are activated/updated or triggered and transmitted on the same set of antenna ports. Among these SRS resources (resource sets) with the same ID, one is the reference SRS resource (set) and the rest are target SRS resources (resource sets). The reference SRS resource (set) is implicitly or explicitly indicated in MAC-CE or DCI. In one example for the implicit indication, the first indicated SRS resource (set) (corresponding to the first indicated cell in MAC-CE or DCI) is the reference SRS resource set for that group for each group of indicated SRS resources (resource sets) with the same ID. In an example for the explicit indication, the reference SRS resource (set) is explicitly indicated by indicating its corresponding cell ID for each group of indicated SRS resources (resource sets) with the same ID.

Potential technical benefit(s)/advantage(s) of Example Embodiment 4 include, but are not necessarily limited to enabling MAC-CE or DCI to activate/update or trigger SRS resources (resource sets) in multiple cells with a single message where each cell having multiple activated/updated or triggered SRS resources (resource sets). Activated/updated or triggered SRS resources (resource sets) of different cells that have the same ID are transmitted on the same set of antenna ports.

In a fifth example embodiment, the higher layer and lower layer signaling utilized to indicate the target and reference SRSs that are to be used by a UE for SRS CA include:
- A) N list of M serving cell indices are provided in RRC (M>=N). These lists may be called $L_1, \ldots L_N$
- B) MAC-CE or DCI indicates K sets of serving cell indices from the above N lists. These sets may be called $\ldots, S_K$.
  - Each set of serving cell indices $S_k$ (k=1, ..., K) includes N serving cell indices where there is no two serving cell indices in the same set $S_k$ that belong to the same list $L_j$ (j=1, ..., N). For each set $S_k$, the groups of SRS resources (resource sets) with the same ID in the indicated N serving cells are activated/updated or triggered and transmitted on the same antenna port.
  - For each set $S_k$, the reference SRS resource (set) for each group is implicitly or explicitly indicated in MAC-CE or DCI. In an example for Implicit indication, for each group of indicated SRS resources (resource sets) with the same ID, the first indicated SRS resource (set) (corresponding to the first indicated cell in $S_k$) is the reference SRS resource set for that group. In an example for explicit indication, for each group of indicated SRS resources (resource sets) with the same ID, the reference SRS resource (set) is explicitly indicated by indicating its corresponding cell ID.

Figure 8:
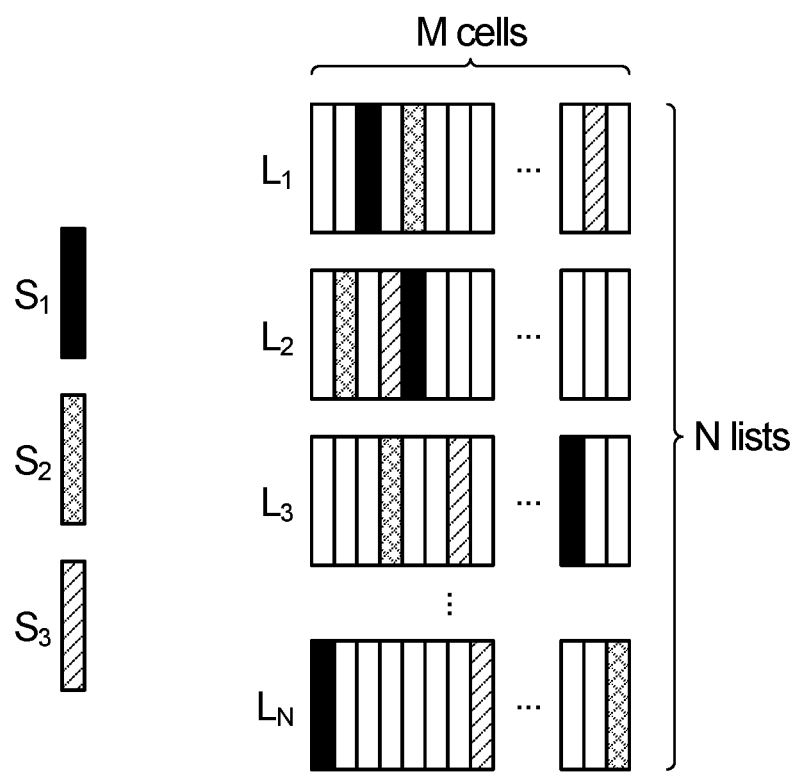
FIG. 8 illustrates an example technique for configuring K sets of N sounding reference signal resources (or resource sets) for carrier aggregation using K sets of N serving cell indices selected from N lists of M serving cell indices according to an embodiment of the present disclosure.

An illustrative example of Example Embodiment 5 for K=3 is shown in FIG. 8.

Example Embodiment 5 can be considered as an extension to Example Embodiment 4 where, instead of activating/updating or triggering SRS resources (resource sets) in one set of cells using a single MAC-CE or DCI message, SRS resources (resource sets) in multiple sets of cells are activated/updated or triggered using a single MAC-CE or DCI message.

In a sixth example embodiment, the higher layer and lower layer signaling utilized to indicate the target and reference SRSs that are to be used by a UE for SRS CA include: A reference SRS resource (set) is provided in the target SRS resource (set) configuration in RRC. The reference SRS resource (set) is indicated in RRC with at least its serving cell ID, BWP Id, and SRS resource (set) ID. The target SRS resource (set) is transmitted on the same set of antenna ports as the reference SRS resource (set) during the time interval that the reference SRS resource (set) is activated. If target SRS resource (set) is also transmitted outside the time interval that the reference SRS resource (set) is activated, the target SRS resource (set) is transmitted based on its own configuration in the time duration that the reference SRS resource (set) is not activated. If the reference SRS resource (set) is a semi-persistent SRS resource (set), its activation and de-activation is indicated in MAC-CE.

Potential technical benefit(s)/advantage(s) of Example Embodiment 6 include, but are not necessarily limited to: A target SRS resource (set) is associated with a reference SRS resource (set). It is noted that one reference SRS resource (set) can be included in the configuration of N−1 (N>=2) target SRS resources (resource sets) to associate with all of them. Moreover, the target SRS resource (set) is transmitted based on its own configuration unless its reference SRS resource (set) is active. This facilitates using target SRS resources for other purposes outside the active time of the reference SRS resource (set).

In a seventh example embodiment, the higher layer and lower layer signaling utilized to indicate the target and reference SRSs that are to be used by a UE for SRS CA include: A list of N−1 (N>=2) target SRS resources (resource sets) is provided in the reference SRS resource (set) configuration in RRC. In this embodiment, each target SRS resource (set) is indicated in RRC with at least its serving cell ID, BWP ID, and SRS resource (set) ID. The target SRS resources (resource sets) are transmitted on the same set of antenna ports as the reference SRS resource (set) during the time interval that the reference SRS resource (set) is activated. If a target SRS resource (set) is also transmitted outside the time interval that the reference SRS resource (set) is activated, the target SRS resource (set) is transmitted based on its own configuration in the time duration that the reference SRS resource (set) is not activated. If the reference SRS resource (set) is a semi-persistent SRS resource (set), its activation and de-activation is indicated in MAC-CE.

Example Embodiment 7 can be considered a dual of Example Embodiment 6 where instead of indicating a reference SRS resource (set) in the configuration of one or multiple target SRS resource (set), N−1 (N>=2) target SRS resource sets are indicated in the configuration of the reference SRS resource set.

In an eighth example embodiment, the higher layer and lower layer signaling utilized to indicate the target and reference SRSs that are to be used by a UE for SRS CA include:

A) A sequence of M IDs (1, . . . , M) is provided in the configuration of SRS resources (resource sets).

B) MAC-CE or DCI can indicate one of the IDs for each SRS resource (set). The N (N>=2) SRS resources (resource sets) whose indicated IDs are the same, are transmitted on the same set of antenna ports. UE expects that the N (N>=2) SRS resources (resource sets) whose indicated IDs are the same are on N different carrier components (cells).

The reference SRS resource (set) is implicitly or explicitly indicated. In an example for Implicit indication, for each group of indicated SRS resources (resource sets) whose indicated IDs are the same, the first indicated SRS resource (set) in MAC-CE or DCI or the SRS resource (set) with the lowest serving cell ID is the reference SRS resource (set). In an example for explicit indication, for each group of indicated SRS resources (resource sets) whose indicated IDs are the same, the reference SRS resource (set) is explicitly indicated in MAC-CE or DCI.

In Example Embodiment 8, the group of N SRS resources (resource sets) that may be transmitted on the same set of antenna ports are indicated using a shared ID value where this ID can be different from the resource (set) ID of the corresponding SRS resources (resource sets).

Some of the embodiments and examples described above may also be applied to other applications and scenarios as well, such as in the case of satellite communication and Internet of Vehicle (IoV). For example, a main aspect of satellite communication is the ability of wideband communication between a device and a non-terrestrial station because narrow-band communication may be severely impaired by ionosphere loss properties. To enable such a wideband communication, the transmission of wideband reference signals both in uplink and downlink may be necessary. Methods disclosed herein are enablers for such wideband RS transmission which can be used for a variety of purposes such as, but not necessarily limited to, accurate positioning of the device and wideband channel estimation, for example. Moreover, IoV is a technology that enables efficient, secure, and high-rate information exchange among vehicles possibly using a vehicular ad Hoc network. To provide such a high data rate vehicle-to-vehicle communication, an accurate wideband channel estimate as well as the relative distance of each vehicle may need to be known at the neighboring vehicles. Efficient wideband SRS transmission mechanisms described in the present disclosure facilitate such relative positioning as well as wideband channel estimates.

The following provides a non-limiting list of additional Example Embodiments of the present disclosure:

Example Embodiment 9. A method for sounding reference signal carrier aggregation in a wireless communication network, the method comprising: receiving, by a user equipment (UE), higher layer signaling that includes sounding reference signal (SRS) configuration information for a plurality of SRSs; receiving, by the UE, lower layer signaling that includes information associating N−1 target SRS from the plurality of SRSs with a reference SRS from the plurality of SRSs, wherein N is an integer and N≥2; and transmitting, by the UE, the reference SRS and the associated N−1 target SRS, the N SRSs, inclusive of the reference SRS and the associated N−1 target SRS, being transmitted on N different respective carrier components (CCs) on a same set of one or more antenna ports such that the N SRSs transmitted on N CCs are coherently combinable.

Example Embodiment 10. The method of Example Embodiment 9, wherein the higher layer signaling comprises a radio resource control (RRC) message and the lower layer signaling comprises a medium access control-control element (MAC-CE) message or a downlink control information (DCI) message.

Example Embodiment 11. The method of Example Embodiment 9, wherein transmitting the N SRSs on N different respective CCs on a same set of one or more antenna ports such that the N SRSs transmitted on N CCs are coherently combinable comprises: overriding configuration parameters for the associated N−1 target SRS with corresponding configuration parameters for the reference SRS based at least in part on the information associating the N−1 target SRS with the reference SRS.

Example Embodiment 12. The method of Example Embodiment 9, wherein the reference SRS is a first reference SRS from the plurality of SRSs, the method further comprising: receiving, by the UE, lower layer signaling that includes information associating P−1 target SRS from the plurality of SRSs with a second reference SRS from the plurality of SRSs, wherein P is an integer, P≥2, and the P−1 target SRS includes at least one of the N−1 target SRS; overriding configuration parameters for the associated P−1 target SRS with corresponding configuration parameters for the second reference SRS based at least in part on the information associating the P−1 target SRS with the second reference SRS; after transmitting the reference SRS and the associated N−1 target SRS, transmitting, by the UE, the second reference SRS and the associated P−1 target SRS, the P SRSs, inclusive of the second reference SRS and the associated P−1 target SRS, being transmitted on P different respective CCs on a same set of one or more antenna ports such that the P SRSs transmitted on P CCs are coherently combinable.

Example Embodiment 13. The method of Example Embodiment 9, wherein: the SRS configuration information received via higher layer signaling comprises a list of target SRS candidates or their corresponding serving cell identifiers (IDs); and the information received via lower layer signaling and associating the N−1 target SRS with the reference SRS comprises information identifying the N−1 target SRS among the list of target SRS candidates as the N−1 target SRS to be transmitted on the same set of at least one antenna port as the reference SRS.

Example Embodiment 14. The method of Example Embodiment 9, wherein: the SRS configuration information received via higher layer signaling comprises, for one or more target SRS candidates inclusive of the N−1 target SRS, a corresponding list of reference SRS candidates; and the information received via lower layer signaling and associating the N−1 target SRS with the reference SRS comprises information identifying, for each of the N−1 target SRS, the reference SRS among the corresponding list of reference SRS candidates for the target SRS.

Example Embodiment 15. The method of Example Embodiment 14, wherein the higher layer signaling includes information that indicates, for each reference SRS candidate, at least its serving cell ID, bandwidth part ID, and SRS ID.

Example Embodiment 16. The method of Example Embodiment 9, wherein: the SRS configuration information received via higher layer signaling comprises, for each of a plurality of reference SRS candidates inclusive of the reference SRS, a corresponding list of target SRS candidates; and the information received via lower layer signaling and associating the N−1 target SRS with the reference SRS comprises information identifying the N−1 target SRS among the corresponding list of target SRS candidates for the reference SRS.

Example Embodiment 17. The method of Example Embodiment 14, wherein the higher layer signaling includes information that indicates, for each target SRS candidate, at least its serving cell ID, bandwidth part ID, and SRS ID.

Example Embodiment 18. The method of Example Embodiment 9, wherein: the SRS configuration information received via higher layer signaling comprises a list of M serving cell indices, M≥N; and the information received via lower layer signaling and associating the N−1 target SRS with the reference SRS comprises information identifying N serving cell IDs from the list of M serving cell IDs; the reference SRS and the N−1 target SRS are the N SRSs with the same ID in the N serving cells corresponding to the N serving cell IDs identified in the information received via lower layer signaling.

Example Embodiment 19. The method of Example Embodiment 9, wherein: the SRS configuration information received via higher layer signaling comprises N lists of M serving cell indices, $L_1, \ldots L_N$, M≥N; and the information received via lower layer signaling and associating the N−1 target SRS with the reference SRS comprises information identifying K sets of serving cell indices, $S_1, \ldots, S_K$, from the N lists of M serving cell indices, $L_1, \ldots, L_N$; each set of serving cell indices $S_k$ (k=1, ..., K) includes N serving cell indices, wherein no two serving cell indices in the same set $S_k$ belong to the same list $L_j$ (j=1, ..., N); and the reference SRS and the N−1 target SRS are the N SRSs with the same ID in the N serving cells corresponding to the N serving cell indices included in one of the K sets of serving cell indices, $S_1, \ldots, S_K$, identified in the information received via lower layer signaling.

Example Embodiment 20. The method of Example Embodiment 9, wherein: the SRS configuration information received via higher layer signaling comprises target SRS configuration information that, for each of the N−1 target SRS, identifies the reference SRS; and during a time interval that the reference SRS is activated: original configuration parameters for the associated N−1 target SRS are overridden with corresponding configuration parameters for the reference SRS; and the N SRSs, inclusive of the reference SRS and the associated N−1 target SRS, are transmitted on N different respective CCs on the same set of one or more antenna ports.

Example Embodiment 21. The method of Example Embodiment 20, further comprising, outside the time interval that the reference SRS is activated, transmitting the N−1 target SRS based on their original configuration parameters.

Example Embodiment 22. The method of Example Embodiment 20 or 21, wherein the information received via lower layer signaling and associating the N−1 target SRS with the reference SRS comprises information for selectively activating or de-activating the reference SRS.

Example Embodiment 23. The method of any one of Example Embodiments 12 to 14, wherein the target SRS configuration information identifies the reference SRS with at least its serving cell ID, BWP ID, and SRS ID.

Example Embodiment 24. The method of Example Embodiment 9, wherein: the SRS configuration information received via higher layer signaling comprises, for each of a plurality of reference SRS candidates inclusive of the reference SRS, a corresponding list of N−1 target SRS candidates; and during a time interval that the reference SRS is activated: original configuration parameters for the N−1 target SRS in the list of N−1 target SRS candidates corresponding to the reference SRS are overridden with corresponding configuration parameters for the reference SRS; and the N SRSs, inclusive of the reference SRS and the N−1 target SRS in the list of N−1 target SRS candidates corresponding to the reference SRS, are transmitted on N different respective CCs on the same set of one or more antenna ports.

Example Embodiment 25. The method of Example Embodiment 24, further comprising, outside the time interval that the reference SRS is activated, transmitting the N−1 target SRS in the list of N−1 target SRS candidates corresponding to the reference SRS based on their original configuration parameters.

Example Embodiment 26. The method of Example Embodiment 24 or 25, wherein the information received via lower layer signaling and associating the N−1 target SRS with the reference SRS comprises information for selectively activating or de-activating the reference SRS.

Example Embodiment 27. The method of any one of Example Embodiments 24 to 26, wherein the higher layer signaling includes information that indicates, for each target SRS candidate, at least its serving cell ID, bandwidth part ID, and SRS ID.

Example Embodiment 28. The method of Example Embodiment 9, wherein: the SRS configuration information received via higher layer signaling comprises a sequence of M IDs; the information received via lower layer signaling and associating the N−1 target SRS with the reference SRS comprises information indicating, for each of the plurality of SRSs, one of the IDs from the sequence of M IDs such that N SRSs of the plurality of SRSs have a same indicated ID from the sequence of M IDs; and the reference SRS and the N−1 target SRS are those N SRSs having the same ID indicated by the information received via lower layer signaling.

Example Embodiment 29. The method of any one of Example Embodiments 9 to 28, further comprising: transmitting, by the UE, SRS capability information indicating the UE is capable of transmitting N SRSs on N carrier components each on a different carrier component on a same set of at least one antenna port.

Example Embodiment 30. The method of Example Embodiment 29, wherein transmitting the SRS capability information comprises transmitting information indicating one or more of: support for N power amplifier structure; support for phase continuity; support for phase continuity for SRS; support for same antenna port transmission; support for same set of antenna ports transmission; support for same antenna port transmission for SRS; or support for same antenna set of ports transmission for SRS.

Example Embodiment 31. The method of Example Embodiment 29 or 30, wherein the SRS capability information is transmitted by the UE to a serving base station using radio resource control (RRC) protocol and/or to a location management function (LMF) in the wireless communication network using a long term evolution positioning protocol (LPP).

Example Embodiment 32. A method for sounding reference signal carrier aggregation in a wireless communication network, the method comprising: transmitting, by a base station (BS) to a user equipment (UE), higher layer signaling that includes sounding reference signal (SRS) configuration information for a plurality of SRSs; transmitting, by the BS to the UE, lower layer signaling that includes information associating N−1 target SRS from the plurality of SRSs with a reference SRS from the plurality of SRSs, wherein N is an integer and N≥2; receiving, by the BS from the UE, the N SRSs, inclusive of the reference SRS and the associated N−1 target SRS, on N different respective carrier components (CCs), the N SRSs having been transmitted by the UE on a same set of one or more antenna ports such that the N SRSs received on N CCs are coherently combinable at the BS.

Example Embodiment 33. The method of Example Embodiment 32, wherein the higher layer signaling comprises a radio resource control (RRC) message and the lower layer signaling comprises a medium access control-control element (MAC-CE) message or a downlink control information (DCI) message.

Example Embodiment 34. The method of Example Embodiment 32 or 33, further comprising: coherently combining, by the BS, the N SRSs received on N CCs; and performing, by the BS, at least one uplink channel measurement based on the coherent combination of the N SRSs received on N CCs.

Example Embodiment 35. The method of any one of Example Embodiments 32 to 34, wherein the BS transmits the lower layer signaling that includes information associating N−1 target SRS from the plurality of SRSs with a reference SRS from the plurality of SRSs in order to cause configuration parameters for the associated N−1 target SRS to be overridden with corresponding configuration parameters for the reference SRS.

Example Embodiment 36. The method of any one of Example Embodiments 32 to 35, wherein the reference SRS is a first reference SRS from the plurality of SRSs, the method further comprising: transmitting, by the BS to the UE, lower layer signaling that includes information associating P−1 target SRS from the plurality of SRSs with a second reference SRS from the plurality of SRSs, wherein P is an integer, and the P−1 target SRS includes at least one of the N−1 target SRS, wherein the lower layer signaling that includes information associating the P−1 target SRS with the second reference SRS causing configuration parameters for the associated P−1 target SRS to be overridden with corresponding configuration parameters for the second reference SRS; and receiving, by the BS from the UE, the P SRSs, inclusive of the second reference SRS and the associated P−1 target SRS, on P different respective carrier components (CCs), the P SRSs having been transmitted by the UE on a same set of one or more antenna ports such that the P SRSs transmitted on P CCs are coherently combinable at the BS.

Example Embodiment 37. The method of any one of Example Embodiments 32 to 34, wherein: the SRS configuration information transmitted via higher layer signaling comprises a list of target SRS candidates or their corresponding serving cell identifiers (IDs); and the information transmitted via lower layer signaling and associating the N−1 target SRS with the reference SRS comprises information identifying the N−1 target SRS among the list of target SRS candidates as the N−1 target SRS to be transmitted on the same set of at least one antenna port as the reference SRS.

Example Embodiment 38. The method of any one of Example Embodiments 32 to 34, wherein: the SRS configuration information transmitted via higher layer signaling comprises, for one or more target SRS candidates inclusive of the N−1 target SRS, a corresponding list of reference SRS candidates; and the information transmitted via lower layer signaling and associating the N−1 target SRS with the reference SRS comprises information identifying, for each of the N−1 target SRS, the reference SRS among the corresponding list of reference SRS candidates for the target SRS.

Example Embodiment 39. The method of Example Embodiment 38, wherein the higher layer signaling includes information that indicates, for each reference SRS candidate, at least its serving cell ID, bandwidth part ID, and SRS ID.

Example Embodiment 40. The method of any one of Example Embodiments 32 to 34, wherein: the SRS configuration information transmitted via higher layer signaling comprises, for each of a plurality of reference SRS candidates inclusive of the reference SRS, a corresponding list of target SRS candidates; and the information transmitted via lower layer signaling and associating the N−1 target SRS with the reference SRS comprises information identifying the N−1 target SRS among the corresponding list of target SRS candidates for the reference SRS.

Example Embodiment 41. The method of Example Embodiment 40, wherein the higher layer signaling includes information that indicates, for each target SRS candidate, at least its serving cell ID, bandwidth part ID, and SRS ID.

Example Embodiment 42. The method of any one of Example Embodiments 32 to 34, wherein: the SRS configuration information transmitted via higher layer signaling comprises a list of M serving cell indices, M≥N; and the information transmitted via lower layer signaling and associating the N−1 target SRS with the reference SRS comprises information identifying N serving cell IDs from the list of M serving cell IDs; the reference SRS and the N−1 target SRS are the N SRSs with the same ID in the N serving cells corresponding to the N serving cell IDs identified in the information transmitted via lower layer signaling.

Example Embodiment 43. The method of any one of Example Embodiments 32 to 34, wherein: the SRS configuration information transmitted via higher layer signaling comprises N lists of M serving cell indices, $L_1, \ldots L_N$, M≥N; and the information transmitted via lower layer signaling and associating the N−1 target SRS with the reference SRS comprises information identifying K sets of serving cell indices, $S_1, \ldots, S_K$, from the N lists of M serving cell indices, $L_1, \ldots L_N$; each set of serving cell indices $S_k$ (k=1, ..., K) includes N serving cell indices, wherein no two serving cell indices in the same set $S_k$ belong to the same list $L_j$ (j=1, ..., N); and the reference SRS and the N−1 target SRS are the N SRSs with the same ID in the N serving cells corresponding to the N serving cell indices included in one of the K sets of serving cell indices, $S_1, \ldots, S_K$, identified in the information transmitted via lower layer signaling.

Example Embodiment 44. The method of any one of Example Embodiments 32 to 34, wherein: the SRS configuration information transmitted via higher layer signaling comprises target SRS configuration information that, for each of the N−1 target SRS, identifies the reference SRS; and transmitting the lower layer signaling to the UE comprises transmitting lower layer signaling to the UE to activate the reference SRS such that during a time interval that the reference SRS is activated: original configuration parameters for the associated N−1 target SRS are overridden with corresponding configuration parameters for the reference SRS; and the N SRSs, inclusive of the reference SRS and the associated N−1 target SRS, are received by the BS on N different respective CCs.

Example Embodiment 45. The method of Example Embodiment 44, further comprising, outside the time interval that the reference SRS is activated, receiving, by the BS from the UE, the N−1 target SRS based on their original configuration parameters.

Example Embodiment 46. The method of Example Embodiment 44 or 45, wherein the information transmitted via lower layer signaling comprises information for selectively activating or de-activating the reference SRS.

Example Embodiment 47. The method of any one of Example Embodiments 44 to 46, wherein the target SRS configuration information identifies the reference SRS with at least its serving cell ID, BWP ID, and SRS ID.

Example Embodiment 48. The method of any one of Example Embodiments 32 to 34, wherein: the SRS configuration information transmitted via higher layer signaling comprises, for each of a plurality of reference SRS candidates inclusive of the reference SRS, a corresponding list of N−1 target SRS candidates; and transmitting the lower layer signaling to the UE comprises transmitting lower layer signaling to the UE to activate the reference SRS such that during a time interval that the reference SRS is activated: original configuration parameters for the N−1 target SRS in the list of N−1 target SRS candidates corresponding to the reference SRS are overridden with corresponding configuration parameters for the reference SRS; and the N SRSs, inclusive of the reference SRS and the N−1 target SRS in the list of N−1 target SRS candidates corresponding to the reference SRS, are received by the BS on N different respective CCs.

Example Embodiment 49. The method of Example Embodiment 48, further comprising, outside the time interval that the reference SRS is activated, receiving the N−1 target SRS in the list of N−1 target SRS candidates corresponding to the reference SRS based on their original configuration parameters.

Example Embodiment 50. The method of Example Embodiment 48 or 49, wherein the information transmitted via lower layer signaling comprises information for selectively activating or de-activating the reference SRS.

Example Embodiment 51. The method of any one of Example Embodiments 48 to 50, wherein the higher layer signaling includes information that indicates, for each target SRS candidate, at least its serving cell ID, bandwidth part ID, and SRS ID.

Example Embodiment 52. The method of any one of Example Embodiments 32 to 34, wherein: the SRS configuration information transmitted via higher layer signaling comprises a sequence of M IDs; the information transmitted via lower layer signaling and associating the N−1 target SRS with the reference SRS comprises information indicating, for each of the plurality of SRSs, one of the IDs from the sequence of M IDs such that N SRSs of the plurality of SRSs have a same indicated ID from the sequence of M IDs; and the reference SRS and the N−1 target SRS are those N SRSs having the same ID indicated by the information transmitted via lower layer signaling.

Example Embodiment 53. The method of any one of Example Embodiments 32 to 52, further comprising: receiving, by the BS, SRS capability information for the UE indicating the UE is capable of transmitting N SRSs on N carrier components each on a different carrier component on a same set of at least one antenna port.

Example Embodiment 54. The method of Example Embodiment 53, wherein the SRS capability information comprises information indicating one or more of: support for N power amplifier structure; support for phase continuity; support for phase continuity for SRS; support for same antenna port transmission; support for same set of antenna ports transmission; support for same antenna port transmission for SRS; or support for same antenna set of ports transmission for SRS.

Example Embodiment 55. The method of Example Embodiment 53 or 54, wherein the SRS capability information is received by the BS from the UE using radio resource control (RRC) protocol and/or from a location management function (LMF) in the wireless communication network using new radio positioning protocol a (NRPPa) protocol.

Example Embodiment 56. An apparatus comprising: at least one processor; and a computer readable storage medium operatively coupled to the at least one processor, the computer readable storage medium storing programming for execution by the at least one processor, the programming comprising instructions for perform any one method of above example embodiments.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein. The machine-executable instructions may be in the form of code sequences, configuration information, or other data, which, when executed, cause a machine (e.g., a processor or other processing device) to perform steps in a method according to examples of the present disclosure.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for sounding reference signal (SRS) carrier aggregation in a wireless communication network, the method comprising:
   receiving, by a user equipment (UE), higher layer signaling that includes SRS configuration information for a plurality of SRSs;
   receiving, by the UE, lower layer signaling that includes information associating N−1 target SRS from the plurality of SRSs with a reference SRS from the plurality of SRSs, wherein N is an integer and N≥2;
   overriding configuration parameters for the associated N−1 target SRS with corresponding configuration parameters for the reference SRS based at least in part on the information associating the N−1 target SRS with the reference SRS; and
   transmitting, by the UE, the reference SRS and the associated N−1 target SRS, the N SRSs, inclusive of the reference SRS and the associated N−1 target SRS, being transmitted on N different respective carrier components (CCs) on a same set of one or more antenna ports.

2. The method of claim 1, wherein:
   the SRS configuration information received via higher layer signaling comprises a list of target SRS candidates or their corresponding serving cell identifiers (IDs); and
   the information received via lower layer signaling and associating the N−1 target SRS with the reference SRS comprises information identifying the N−1 target SRS among the list of target SRS candidates as the N−1 target SRS to be transmitted on the same set of at least one antenna port as the reference SRS.

3. The method of claim 1, wherein:
   the SRS configuration information received via higher layer signaling comprises, for each of a plurality of reference SRS candidates inclusive of the reference SRS, a corresponding list of target SRS candidates; and
   the information received via lower layer signaling and associating the N−1 target SRS with the reference SRS comprises information identifying the N−1 target SRS among the corresponding list of target SRS candidates for the reference SRS.

4. The method of claim 1, wherein:
   the SRS configuration information received via higher layer signaling comprises a list of M serving cell indices, MEN; and
   the information received via lower layer signaling and associating the N−1 target SRS with the reference SRS comprises information identifying N serving cell IDs from the list of M serving cell IDs;
   the reference SRS and the N−1 target SRS are the N SRSs with the same ID in the N serving cells corresponding to the N serving cell IDs identified in the information received via lower layer signaling.

5. The method of claim 1, wherein:
   the SRS configuration information received via higher layer signaling comprises a sequence of M IDs;
   the information received via lower layer signaling and associating the N−1 target SRS with the reference SRS comprises information indicating, for each of the plurality of SRSs, one of the IDs from the sequence of M IDs such that N SRSs of the plurality of SRSs have a same indicated ID from the sequence of M IDs; and
   the reference SRS and the N−1 target SRS are those N SRSs having the same ID indicated by the information received via lower layer signaling.

6. The method of claim 1, further comprising:
   transmitting, by the UE, SRS capability information indicating the UE is capable of transmitting N SRSs on N carrier components each on a different carrier component on a same set of at least one antenna port.

7. A method for sounding reference signal carrier aggregation in a wireless communication network, the method comprising:
   transmitting, by a base station (BS) to a user equipment (UE), higher layer signaling that includes sounding reference signal (SRS) configuration information for a plurality of SRSs;
   transmitting, by the BS to the UE, lower layer signaling that includes information associating N−1 target SRS from the plurality of SRSs with a reference SRS from the plurality of SRSs, wherein N is an integer and N≥2, wherein the BS transmits the lower layer signaling that includes information associating N−1 target SRS from the plurality of SRSs with a reference SRS from the plurality of SRSs in order to cause configuration parameters for the associated N−1 target SRS to be overridden with corresponding configuration parameters for the reference SRS; and
   receiving, by the BS from the UE, the N SRSs, inclusive of the reference SRS and the associated N−1 target SRS, on N different respective carrier components (CCs), the N SRSs having been transmitted by the UE on a same set of one or more antenna ports.

8. The method of claim 7, wherein:
   the SRS configuration information transmitted via higher layer signaling comprises a list of target SRS candidates or their corresponding serving cell identifiers (IDs); and
   the information transmitted via lower layer signaling and associating the N−1 target SRS with the reference SRS comprises information identifying the N−1 target SRS among the list of target SRS candidates as the N−1 target SRS to be transmitted on the same set of at least one antenna port as the reference SRS.

9. The method of claim 7, wherein:
   the SRS configuration information transmitted via higher layer signaling comprises, for each of a plurality of reference SRS candidates inclusive of the reference SRS, a corresponding list of target SRS candidates; and
   the information transmitted via lower layer signaling and associating the N−1 target SRS with the reference SRS comprises information identifying the N−1 target SRS among the corresponding list of target SRS candidates for the reference SRS.

10. The method of claim 7, wherein:
    the SRS configuration information transmitted via higher layer signaling comprises a list of M serving cell indices, MEN; and
    the information transmitted via lower layer signaling and associating the N−1 target SRS with the reference SRS comprises information identifying N serving cell IDs from the list of M serving cell IDs;
    the reference SRS and the N−1 target SRS are the N SRSs with the same ID in the N serving cells corresponding to the N serving cell IDs identified in the information transmitted via lower layer signaling.

11. The method of claim 7, wherein:
the SRS configuration information transmitted via higher layer signaling comprises a sequence of M IDs;
the information transmitted via lower layer signaling and associating the N−1 target SRS with the reference SRS comprises information indicating, for each of the plurality of SRSs, one of the IDs from the sequence of M IDs such that N SRSs of the plurality of SRSs have a same indicated ID from the sequence of M IDs; and
the reference SRS and the N−1 target SRS are those N SRSs having the same ID indicated by the information transmitted via lower layer signaling.

12. The method of claim 7, further comprising:
receiving, by the BS, SRS capability information for the UE indicating the UE is capable of transmitting N SRSs on N carrier components each on a different carrier component on a same set of at least one antenna port.

13. An apparatus comprising:
at least one processor; and
a computer readable storage medium operatively coupled to the at least one processor, the computer readable storage medium storing programming for execution by the at least one processor, the programming comprising instructions for:
receiving higher layer signaling that includes sounding reference signal (SRS) configuration information for a plurality of SRSs;
receiving lower layer signaling that includes information associating N−1 target SRS from the plurality of SRSs with a reference SRS from the plurality of SRSs, wherein N is an integer and N≥2;
overriding configuration parameters for the associated N−1 target SRS with corresponding configuration parameters for the reference SRS based at least in part on the information associating the N−1 target SRS with the reference SRS; and
transmitting the reference SRS and the associated N−1 target SRS, the N SRSs, inclusive of the reference SRS and the associated N−1 target SRS, being transmitted on N different respective carrier components (CCs) on a same set of one or more antenna ports.

14. The apparatus of claim 13, wherein:
the SRS configuration information received via higher layer signaling comprises a list of target SRS candidates or their corresponding serving cell identifiers (IDs); and
the information received via lower layer signaling and associating the N−1 target SRS with the reference SRS comprises information identifying the N−1 target SRS among the list of target SRS candidates as the N−1 target SRS to be transmitted on the same set of at least one antenna port as the reference SRS.

15. The apparatus of claim 13, wherein:
the SRS configuration information received via higher layer signaling comprises a sequence of M IDs;
the information received via lower layer signaling and associating the N−1 target SRS with the reference SRS comprises information indicating, for each of the plurality of SRSs, one of the IDs from the sequence of M IDs such that N SRSs of the plurality of SRSs have a same indicated ID from the sequence of M IDs; and
the reference SRS and the N−1 target SRS are those N SRSs having the same ID indicated by the information received via lower layer signaling.

16. The apparatus of claim 13, wherein the programming comprises instructions for:
transmitting SRS capability information indicating the apparatus is capable of transmitting N SRSs on N carrier components each on a different carrier component on a same set of at least one antenna port.

17. An apparatus comprising:
at least one processor; and
a computer readable storage medium operatively coupled to the at least one processor, the computer readable storage medium storing programming for execution by the at least one processor, the programming comprising instructions for:
transmitting, to a user equipment (UE), higher layer signaling that includes sounding reference signal (SRS) configuration information for a plurality of SRSs;
transmitting, to the UE, lower layer signaling that includes information associating N−1 target SRS from the plurality of SRSs with a reference SRS from the plurality of SRSs, wherein N is an integer and N≥2, wherein the apparatus transmits the lower layer signaling that includes information associating N−1 target SRS from the plurality of SRSs with a reference SRS from the plurality of SRSs in order to cause configuration parameters for the associated N−1 target SRS to be overridden with corresponding configuration parameters for the reference SRS; and
receiving, from the UE, the N SRSs, inclusive of the reference SRS and the associated N−1 target SRS, on N different respective carrier components (CCs), the N SRSs having been transmitted by the UE on a same set of one or more antenna ports.

18. The apparatus of claim 17, wherein:
the SRS configuration information transmitted via higher layer signaling comprises a list of target SRS candidates or their corresponding serving cell identifiers (IDs); and
the information transmitted via lower layer signaling and associating the N−1 target SRS with the reference SRS comprises information identifying the N−1 target SRS among the list of target SRS candidates as the N−1 target SRS to be transmitted on the same set of at least one antenna port as the reference SRS.

19. The apparatus of claim 17, wherein:
the SRS configuration information transmitted via higher layer signaling comprises a sequence of M IDs;
the information transmitted via lower layer signaling and associating the N−1 target SRS with the reference SRS comprises information indicating, for each of the plurality of SRSs, one of the IDs from the sequence of M IDs such that N SRSs of the plurality of SRSs have a same indicated ID from the sequence of M IDs; and
the reference SRS and the N−1 target SRS are those N SRSs having the same ID indicated by the information transmitted via lower layer signaling.

20. The apparatus of claim 17, wherein the programming comprises instructions for:
receiving SRS capability information for the UE indicating the UE is capable of transmitting N SRSs on N carrier components each on a different carrier component on a same set of at least one antenna port.

* * * * *

UNITED STATES PATENT AND TRADEMARK OFFICE
CERTIFICATE OF CORRECTION

PATENT NO. : 12,081,473 B2
APPLICATION NO. : 17/410470
DATED : September 3, 2024
INVENTOR(S) : Keyvan Zarifi Page 1 of 1

It is certified that error appears in the above-identified patent and that said Letters Patent is hereby corrected as shown below:

In the Claims

At Column 35, Line 52, Claim 4:
"indices, MEN; and"
Should be:
-- indices, $M \geq N$; and --

At Column 36, Line 59, Claim 10:
"indices, MEN; and"
Should be:
-- indices, $M \geq N$; and --

Signed and Sealed this
Eleventh Day of February, 2025

Coke Morgan Stewart
*Acting Director of the United States Patent and Trademark Office*